United States Patent
Wernersson et al.

(12)

(10) Patent No.: US 12,156,139 B2
(45) Date of Patent: *Nov. 26, 2024

(54) LIMITING ACCUMULATION OF TRANSMIT POWER CONTROL IN BEAM-SPECIFIC POWER CONTROL

(71) Applicant: Telefonaktiebolaget LM Ericsson (publ), Stockholm (SE)

(72) Inventors: Niklas Wernersson, Kungsängen (SE); Ravikiran Nory, San José, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,928

(22) Filed: May 11, 2021

(65) Prior Publication Data

US 2021/0266842 A1 Aug. 26, 2021

Related U.S. Application Data

(63) Continuation of application No. 16/763,638, filed as application No. PCT/EP2018/081602 on Nov. 16, 2018, now Pat. No. 11,019,571.

(Continued)

(51) Int. Cl.
*H04W 52/08* (2009.01)
*H04W 52/14* (2009.01)
*H04W 52/42* (2009.01)

(52) U.S. Cl.
CPC ......... *H04W 52/08* (2013.01); *H04W 52/146* (2013.01); *H04W 52/42* (2013.01)

(58) Field of Classification Search
CPC ........... H04W 52/00–60; H04W 52/08; H04W 52/42; H04W 52/146
See application file for complete search history.

(56) References Cited

U.S. PATENT DOCUMENTS 6,490,460 B1* 12/2002 Soliman ................ H04W 52/28
455/69
7,835,762 B2* 11/2010 Sendonaris ......... H04W 52/282
455/69

(Continued)

FOREIGN PATENT DOCUMENTS

CN       102550090 A     7/2012
WO    2019 049107 A1     2/2019

(Continued)

OTHER PUBLICATIONS

3GPP TS 38.213 v1 .0.0; Technical Specification; 3rd Generation Partnership Project; Technical Specification Group Radio Access Network; NR; Physical layer procedures for control (Release 15)—Sep. 2017.

(Continued)

*Primary Examiner* — Raymond S Dean
(74) *Attorney, Agent, or Firm* — Baker Botts L.L.P.

(57) ABSTRACT

A method performed by a wireless device (110, 500, 791, 792) for determining whether the wireless device is power limited is disclosed. The method comprises receiving (1301), from a network node (160, 712), a transmit power control (TPC) command for one or more of a plurality of power control loops configured at the wireless device. The method comprises obtaining (1302) an indication of the one or more of the plurality of power control loops to which the received TPC command applies. The method comprises determining (1303), based on the obtained indication, whether one or more conditions related to power control at the wireless device are fulfilled. The method comprises determining (1304) whether the wireless device is power limited based on whether the one or more conditions are fulfilled.

20 Claims, 12 Drawing Sheets

Related U.S. Application Data

(60) Provisional application No. 62/587,869, filed on Nov. 17, 2017.

(56) References Cited

U.S. PATENT DOCUMENTS

| | | | | |
|---|---|---|---|---|
| 8,229,494 | B1* | 7/2012 | Kela | H04W 52/146 |
| | | | | 455/522 |
| 11,019,571 | B2* | 5/2021 | Wernersson | H04B 7/0617 |
| 2014/0036737 | A1* | 2/2014 | Ekpenyong | H04W 8/245 |
| | | | | 370/280 |
| 2014/0179345 | A1* | 6/2014 | Gunnarsson | H04W 4/029 |
| | | | | 455/456.1 |
| 2014/0199983 | A1* | 7/2014 | Bergstrom | H04W 8/20 |
| | | | | 455/418 |
| 2015/0341866 | A1 | 11/2015 | Park et al. | |
| 2018/0279376 | A1* | 9/2018 | Dinan | H04W 74/0833 |
| 2018/0332541 | A1 | 11/2018 | Liu | |
| 2019/0261281 | A1 | 8/2019 | Jung | |
| 2020/0068497 | A1 | 2/2020 | Gong | |

FOREIGN PATENT DOCUMENTS

| | | |
|---|---|---|
| WO | 2019 049096 A1 | 3/2019 |
| WO | 2019 070178 A1 | 4/2019 |

OTHER PUBLICATIONS

PCT Notification of Transmittal of the International Search Report and the Written Opinion of the International Searching Authority, or the Declaration issued for International application No. PCT/EP2018/081602—Feb. 12, 2019.

TSG-RAN WG1; Sorrento, Iltay; Source: Ericsson; Title: Completion of Open Issues on Power Control Command Accumulation (R1-080882)—Feb. 11-15, 2008.

3GPP Tsg Ran WG1 Nr Ad-Hoc Meeting; Nagoya, Japan; WF on power control framework; Agenda item 6. 7.1 (R1-1716763) -- Sep. 18-21, 2017.

3GPP Tsg Ran WG1 Meeting 90bis; Prague, CZ; Source: Ericsson; Title: Further details on closed loop power control (R1-1718655) -- Oct. 9-13, 2017.

3GPP Tsg Ran WG1 Meeting #90bis; Prague, Czechia; Source: ZTE; Title: Offline summary for AI 7.6 Nr Ul power control (R1-1718883) -- Oct. 9-13, 2017.

1 Patent Office of China, Office Action in CN 201880086292.1 dated Jan. 3, 2024 (not translated).

* cited by examiner

LIMITING ACCUMULATION OF TRANSMIT POWER CONTROL IN BEAM-SPECIFIC POWER CONTROL

PRIORITY

This application is a continuation, under 35 U.S.C. § 120 of U.S. patent application Ser. No. 16/763,638 filed on May 13, 2020 which is a U.S. National Stage Filing under 35 U.S.C. § 371 of International Patent Application Serial No. PCT/EP2018/081602 filed Nov. 16, 2018 and entitled "*Limiting Accumulation of Transmit Power Control in Beam-Specific Power Control*" which claims priority to U.S. Provisional Patent Application No. 62/587,869 filed Nov. 17, 2017 both of which are hereby incorporated by reference in their entirety.

TECHNICAL FIELD

The present disclosure relates, in general, to wireless communications and, more particularly, to limiting accumulation of transmit power control in, for example, beam-specific power control.

BACKGROUND

1.1 Power Control

Setting output power levels of transmitters (e.g., base stations in downlink (DL) and user equipment (UEs) in uplink (UL)) in mobile systems is commonly referred to as power control. Objectives of power control include improved capacity, coverage, improved system robustness, and reduced power consumption.

In Long Term Evolution (LTE), power control mechanisms can be categorized into the groups (i) open-loop, (ii) closed-loop, and (iii) combined open- and closed-loop. These differ in what input is used to determine the transmit power. In the open-loop case, the transmitter measures some signal sent from the receiver and sets its output power based on this. In the closed-loop case, the receiver measures the signal from the transmitter and, based on this, sends a Transmit Power Control (TPC) command to the transmitter, which then sets its transmit power accordingly. In a combined open- and closed-loop scheme, both inputs are used to set the transmit power.

In systems with multiple channels between the UEs and the base stations (e.g., traffic and control channels), different power control principles may be applied to the different channels. Using different principles yields more freedom in adapting the power control principle to the needs of individual channels. The drawback is increased complexity of maintaining several principles.

1.2 Power Control Loops

In LTE Release 10, for instance, the UE initially performs power control for the Physical Random Access Channel (PRACH) using:

$$P_{PRACH} = \min\{P_{CMAXc}(i), \text{PREAMBLE\_RECEIVED\_TARGET\_POWER} + PL_c\}.$$

After a connection is established between the UE and the eNodeB (eNB), the UE can be configured for performing UL power control also on the Physical Uplink Control Channel (PUCCH), the Physical Uplink Shared Channel (PUSCH), and the Sounding Reference Signal (SRS) transmission. Setting the UE transmit power for a PUCCH transmission is done from:

$$P_{PUCCH} = \min\{P_{CMAX,c}, P_{0,PUCCH} + PL_c + \nabla_{Format} + g(i)\},$$

where $P_{PUCCH}$ is the transmit power to use in a given subframe and $PL_c$ is the pathloss estimated by the UE. For the PUSCH, one instead uses the equation:

$$P_{PUSCH,c} = \min\{P_{CMAX,c} - P_{PUCCH}, P_{0,PUSCH} + \alpha PL_c + 10 \log_{10} M + \nabla_{MCS} + f(i)\}.$$

where c denotes the serving cell and $P_{PUSCH,c}$ is the transmit power to use in a given subframe. For SRS, one defines:

$$P_{SRS,c}(i) = \min\{P_{CMAX,c}(i), P_{SRS\_OFFSETS,c}(m) + 10 \log_{10}(M_{SRS,c}) + P_{C\_PUSCH}(j) + \alpha_c(j) \cdot PL_c (+f_c(i))\}.$$

Note that $PL_c$ is a part of setting the power level for the UE transmission, which corresponds to the open-loop part of power control. It is clear from this that the pathloss estimation conducted by the UE plays an important role in the power control. The pathloss must in turn be estimated from a DL transmission, and is typically done by measuring on a reference signal.

1.3 Closed-Loop Power Control

In the above-described power control formulas, there were two terms f(i) and g(i) defined that correspond to the closed-loop part of the power control. These terms are controlled by signaling from the network node (e.g . . . gNodeB (gNB)) using TPC commands (over Medium Access Control (MAC) Control Element (CE) or Downlink Control Information (DCI)). By using this, the gNB will be able to impact the UE output power, which is useful in order to, for instance: combat estimation errors impacting the UL power control; get rid of biases; and/or adapt the UE output power to the current interference level at the gNB. If the interference is high, the gNB may be motivated to increase the UE output power.

There are different ways to configure the operation of f(i). It can be operating in "accumulated mode" or "absolute mode." If accumulation is enabled, for instance based on the parameter Accumulation-enabled provided by higher layers, f(i) is given from:

$$f_c(i) = f_c(i-1) + \delta_{PUSCH,c}(i - K_{PUSCH}),$$

where $\delta_{PUSCH,c}$ is a correction value, also referred to as a TPC command, and can take on values according to the tables below (see the 3$^{rd}$ Generation Partnership Project (3GPP) Technical Specification (TS) 36213 v. 10.13.0 for more for details on this). Furthermore, the UE shall reset accumulation: for serving cell c, when $P_{O\_UE\_PUSCH,c}$ value is changed by higher layers; and for the primary cell, when the UE receives random access response message.

TABLE 5.1.1.1-2

Mapping of TPC Command Field in DCI format 0/3/4 to absolute and accumulated $\delta_{PUSCH,c}$ values.

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 5.1.1-3

Mapping of TPC Command Field in DCI format 3A
to accumulated $\delta_{PUSCH_c}$ values.

| TPC Command Field in DCI format 3A | Accumulated $\delta_{PUSCH_c}$ [dB] |
|---|---|
| 0 | −1 |
| 1 | 1 |

The functionality of g(i) is similar and defined from:

$$g(i) = g(i-1) + \sum_{m0}^{M1} \delta_{PUCCH}(i - k_m),$$

where g(i) is the current PUCCH power control adjustment state and g(0) is the first value after reset. The UE shall reset accumulation: when $P_{O\_UE\_PUCCH}$ value is changed by higher layers; and when the UE receives a random access response message. $\delta_{PUCCH}$ is given by the tables below.

TABLE 5.1.2.1-1

Mapping of TPC Command Field in DCI format
1A/1B/1D/1/2A/2B/2C/2/3 to $\delta_{PUSCH}$ values.

| TPC Command Field in DCI format 1A/1B/1D/1/2A/2B/2C/2/3 | $\delta_{PUSCH}$ [dB] |
|---|---|
| 0 | −1 |
| 1 | 0 |
| 2 | 1 |
| 3 | 3 |

TABLE 5.1.2.1-2

Mapping of TPC Command Field in
DCI format 3A to $\delta_{PUSCH}$ values.

| TPC Command Field in DCI format 3A | $\delta_{PUSCH}$ [dB] |
|---|---|
| 0 | −1 |
| 1 | 1 |

1.3.1 Individual TPC Commands in UL Grant

A closed-loop power control adjustment, usually referred to as a TPC command, can be sent to the UE as part of an UL grant scheduling a PUSCH transmission (e.g., using DCI format 0/4 in LTE) or a DL assignment scheduling PDSCH (in which case the TPC command applies to setting the transmit power of PUCCH corresponding to the PDSCH scheduled by DL assignment), for example using DCI (e.g., formats 1A, 1, 2, 2A, etc. in LTE).

1.3.2 TPC Commands Sent for a Group of UEs

TPC commands can also be sent to a group of UEs using one Physical Downlink Control Channel (PDCCH) addressed to the group. This can be done by assigning different bit field locations in the DCI of a PDCCH message to different UEs. For example, locations 1,2 for a 2-bit TPC command to UE1, locations 3,4 for a 2-bit TPC command to UE2, and so on. For N UEs, the DCI will have at least 2N bits. A Cyclic Redundancy Check (CRC) that is scrambled by a Radio Network Temporary Identifier (RNTI) is also added to the DCI. Different groups of UEs can be assigned different RNTIs. For example, in LTE such commands are sent for adjusting PUSCH power using DCI format 3/3A and different groups of UEs are assigned different TPC-PUSCH-RNTIs. Similarly, for PUCCH power control different groups of UEs are assigned different TPC-PUCCH-RNTIs. Similarly, SRS group-based TPC commands are sent using DCI format 3B in LTE 1.3.2.1 DCI Format 3 in LTE DCI format 3 in LTE is used for the transmission of TPC commands for PUCCH and PUSCH with 2-bit power adjustments. The following information is transmitted by means of the DCI format 3: TPC command number 1, TPC command number 2, . . . , TPC command number N, where $$N = \left\lfloor \frac{L_{format\,0}}{2} \right\rfloor$$

and $L_{format\,0}$ is equal to the payload size of format 0 before CRC attachment when format 0 is mapped onto the common search space, including any padding bits appended to format 0. The parameter tpc-Index or tpc-Index-PUCCH-SCell-r13 provided by higher layers determines the index to the TPC command for a given UE. If $$\left\lfloor \frac{L_{format\,0}}{2} \right\rfloor < \frac{L_{format\,0}}{2},$$

a bit of value zero shall be appended to format 3.

1.3.2.2 DCI Format 3A in LTE

DCI format 3A in LTE is used for the transmission of TPC commands for PUCCH and PUSCH with single bit power adjustments. The following information is transmitted by means of the DCI format 3A: TPC command number 1, TPC command number 2, . . . , TPC command number M, where M=$L_{format\,0}$ and $L_{format\,0}$ is equal to the payload size of format 0 before CRC attachment when format 0 is mapped onto the common search space, including any padding bits appended to format 0. The parameter tpc-Index or tpc-Index-PUCCH-SCell-r13 provided by higher layers determines the index to the TPC command for a given UE.

1.4 Beam-Specific Power Control

It is agreed that New Radio (NR) supports beam-specific power control. Beam-specific power control may, for instance, be a scheme that enables use cases where separate power control in multiple UE transmit (TX) and gNB receive (RX) beam pairs are maintained. Use cases include for instance: a UE transmitting to a transmission reception point (TRP) using a certain beam switches to another beam and then consequently also switches from one power control loop to another; and a UE transmitting to a TRP switches to another TRP and then consequently also switches from one power control loop to another.

It is expected that the beam-specific power control will imply a set of power control loops as illustrated below for the case of PUSCH. Hence, there will exist a set of power control loops where each power control loop is connected to a beam.

TABLE 1

Power Control (PC) loops Radio Resource
Control (RRC) configured to the UE

| PC idx | PC loop |
|---|---|
| 0 | $P_{PUSCH,c}^{0}$ |
| 1 | $P_{PUSCH,c}^{1}$ |
| 2 | $P_{PUSCH,c}^{2}$ |
| 3 | $P_{PUSCH,c}^{3}$ |
| 4 | $P_{PUSCH,c}^{4}$ |
| 5 | $P_{PUSCH,c}^{5}$ |
| 6 | $P_{PUSCH,c}^{6}$ |

The UL power control loop can in this case be written as:

$$P_{PUSCH,c}^{k} = \min\{P_{CMAX,c}^{k} - P_{PUCCH}^{k\_PUCCH}, P_{0,PUSCH}^{k} + \alpha_k PL_c^{k} + 10\log_{10}M_k + V_{MCS}^{k} + f(i)_k\},$$

Here, the meaning of $\alpha_k$, $P_{0,PUSCH}^{k}$, etc. is that these parameters may be configured in a beam-specific manner and may thus depend on a beam index k. They may, however, also be shared such that for instance $\alpha_0 = \alpha_1 = \ldots = \alpha_6 = \alpha$, meaning that only $\alpha$ needs to be configured. The index k_PUCCH in $P_{PUCCH}^{k\_PUCCH}$ refers to the beam used for PUCCH transmission. Furthermore, $P_{PUCCH}^{k\_PUCCH}$ may also be omitted if no PUCCH transmission is conducted.

Furthermore, $PL_c^{k}$ implies that the path loss estimation is based on a certain reference signal defined for power control loop k. Hence, each time the reference signal corresponding to power control loop k is transmitted it may be used by the UE in order to estimate $PL_c^{k}$, which is typically done by performing a long term averaging, as for example:

$$PL_c^{k} = \text{referenceSignalPower} - \text{higher\_layer\_filtered\_RSRP\_k},$$

where referenceSignalPower is defined by the network.

Finally, note that for a beam currently not used for PUSCH, hence M-0, the equation may instead be defined as:

$$P_{PUSCH,c}^{k} = \min\{P_{CMAX,c}^{k} - P_{PUCCH}^{k\_PUCCH}, P_{0,PUSCH}^{k} + \alpha_k PL_c^{k} + f(i)_k\}.$$

1.4.1 Beam-Specific Power Control in NR

The exact details on how to describe beam-specific power control in NR is still being discussed, but the current proposal is:

$$P_{PUSCH,c}(i,j,q,l) = \min\{P_{CMAX,c}(i) - P_{PUCCH}^{kPUCCH}(i), P_{0,PUSCH}(j) + \alpha_c(j)PL_c(q) + 10\log_{10}M_{PUSCH,c}(i) + V_{TF,c}(i) + fc(i,l)\}$$

Hence, the index k, as described above, may in NR correspond to a certain set of indexes {j,q,l}. One way to think of this it is that there will exist a set of functions j(q), k(q) and l(q) that defines {j,k,l} for a given q. The description herein uses the notation $P_{PUSCH,c}(i, j, q, l)$, although it is a less general case of describing beam-specific power control than when using the notation $P_{PUSCH,c}^{k}$. Still, for someone skilled in the art it will be straightforward to convert the equations between these two formats.

Furthermore, the description herein uses the notation:

$$P_{PUSCH,c}^{unlim}(i,j,q,l) = P_{0,PUSCH}(j) + \alpha_c(j)PL_c(q) + 10\log_{10}M_{PUSCH,c}(i) + V_{TF,c}(i) + fc(i,l),$$

which is the right-hand part of the previous equation so that:

$$P_{PUSCH,c}(i,j,q,l) = \min\{P_{CMAX,c}(i) - P_{PUCCH}^{kPUCCH}(i), P_{PUSCH,c}^{unlim}(i,j,q,l)\}$$

Thus, $P_{PUSCH,c}^{unlim}(i, j, q, l)$ corresponds to the output power of $P_{PUSCH,c}(i, j, q, l)$ if the function were not limited by $P_{CMAX,c}(i)$.

There currently exist certain challenges. For example, in LTE, the UE typically maintains one closed-loop power control adjustment state (i.e., f( ) for PUSCH, g( ) for PUCCH) for each physical channel (e.g., PUSCH/PUCCH) or signal (e.g., SRS) per serving cell. In some cases, the UE may maintain different closed-loop power control adjustment states for different sets of subframes (e.g., f1( ) for a 1$^{st}$ set of subframes configured by Radio Resource Control (RRC); f2( ) for a 2$^{nd}$ set of subframes configured by RRC). Furthermore, if a set of TPC commands are received and the closed-loop power control operates in accumulated mode, the specification specifies that if a UE has reached maximum/minimum power, positive/negative TPC commands shall not be accumulated further.

In NR, the UE can be configured to have N=2 closed loops for PUSCH for a given serving cell and multiple power control loops may be using a given closed loop. Given this, when a TPC command is received by the UE (e.g., using the group-based approach described above in section 1.3.2), it is not trivial to decide on whether a UE has reached maximum/minimum power or not; it may be so that some power control loops corresponds to maximum/minimum power whereas some do not.

SUMMARY

To address the foregoing problems with existing solutions, disclosed is a method performed by a wireless device for determining whether the wireless device is power limited. The method comprises receiving, from a network node, a TPC command for one or more of a plurality of power control loops configured at the wireless device. The method comprises obtaining an indication of the one or more of the plurality of power control loops to which the received TPC command applies. The method comprises determining, based on the obtained indication, whether one or more conditions related to power control at the wireless device are fulfilled. The method comprises determining whether the wireless device is power limited based on whether the one or more conditions are fulfilled.

In certain embodiments, the indication may comprise at least one parameter associated with the one or more of the plurality of power control loops configured at the wireless device.

In certain embodiments, the method may further comprise in response to determining that the wireless device is not power limited, accumulating the received TPC command.

In certain embodiments, the method may further comprise in response to determining that the wireless device is power limited, determining whether to accumulate the received TPC command. In certain embodiments, determining whether the wireless device is power limited may result in a determination that the wireless device is maximum power limited and determining whether to accumulate the received TPC command may comprise: determining whether the received TPC command is positive or negative; and performing one of: in response to determining that the received TPC command is positive, refraining from accumulating the received TPC command; and in response to determining that the received TPC command is negative, accumulating the received TPC command. In certain embodiments, determining whether the wireless device is power limited may result in a determination that the wireless device is minimum power limited and determining whether to accumulate the received TPC command may comprise: determining whether the received TPC command is positive or negative; and performing one of: in response to determining that the received TPC command is negative, refraining from accumulating the received TPC command; and in response to determining that the received TPC command is positive, accumulating the received TPC command.

In certain embodiments, the wireless device may be configured with two power control loops, each of the configured power control loops associated with a different closed loop. Obtaining the indication may comprise receiving a power control loop index indicating that the received TPC command applies to a first power control loop of the configured two power control loops. The determination of whether the one or more conditions are fulfilled may be based on one or more parameters related to the first power control loop. In certain embodiments, the power control loop index may be received implicitly. In certain embodiments, the power control loop index may be received explicitly.

In certain embodiments, the received TPC command may be received via an UL grant. In certain embodiments, the power control loop index may be received via an UL grant.

In certain embodiments, the wireless device may be configured with at least three power control loops, each power control loop associated with one of two closed loops, such that at least two of the three configured power control loops are associated with a first closed loop of the two closed loops. Obtaining the indication may comprise receiving a closed loop index indicating that the received TPC command applies to all configured power control loops that are associated with the first closed loop of the two closed loops. The determination of whether the one or more conditions are fulfilled may be based on one or more parameters related to at least one of the configured power control loops associated with the first closed loop.

In certain embodiments, the received TPC command may be received as part of one or more TPC commands sent to a group of wireless devices. In certain embodiments, the received TPC command may be received in a PDCCH DCI without an associated UL grant.

In certain embodiments, the one or more conditions may be a function of the closed loop index. In certain embodiments, the one or more conditions may comprise a function depending on more than one power control loop. In certain embodiments, the one or more conditions may comprise a condition that all power control loops associated with the received closed loop index must be considered power limited in order to determine that the wireless device is power limited. In certain embodiments, the one or more conditions may comprise a condition that at least one power control loop associated with the received closed loop index must be considered power limited in order to determine that the wireless device is power limited. In certain embodiments, the one or more conditions may comprise a condition that all power control loops must be considered power limited in order to determine that the wireless device is power limited. In certain embodiments, the one or more conditions may comprise a condition that at least one power control loop must be considered power limited in order to determine that the wireless device is power limited.

In certain embodiments, the method may further comprise determining whether a power control loop of the plurality of power control loops is classified as power limited. In certain embodiments, determining whether the power control loop of the plurality of power control loops is classified as power limited may be based on a non-virtual output power. In certain embodiments, determining whether the power control loop of the plurality of power control loops is classified as power limited may be based on a virtual output power. In certain embodiments, determining whether the power control loop of the plurality of power control loops is classified as power limited may be based on a PUCCH transmission power. In certain embodiments, determining whether the power control loop of the plurality of power control loops is classified as power limited may not be based on a PUCCH transmission power.

In certain embodiments, the plurality of power control loops may comprise one or more of: one or more PUCCH power control loops; one or more SRS power control loops; and one or more PUSCH power control loops.

In certain embodiments, power limited may comprise one or more of: maximum power limited; and minimum power limited.

Also disclosed is a wireless device. The wireless device comprises a receiver, a transmitter, and processing circuitry coupled to the receiver and the transmitter. The processing circuitry is configured to receive, from a network node, a TPC command for one or more of a plurality of power control loops configured at the wireless device. The processing circuitry is configured to obtain an indication of the one or more of the plurality of power control loops to which the received TPC command applies. The processing circuitry is configured to determine, based on the obtained indication, whether one or more conditions related to power control at the wireless device are fulfilled. The processing circuitry is configured to determine whether the wireless device is power limited based on whether the one or more conditions are fulfilled.

In certain embodiments, the indication may comprise at least one parameter associated with the one or more of the plurality of power control loops configured at the wireless device.

In certain embodiments, the processing circuitry may be further configured to accumulate the received TPC command in response to a determination that the wireless device is not power limited. In certain embodiments, the processing circuitry may be further configured to determine whether to accumulate the received TPC command in response to a determination that the wireless device is power limited.

In certain embodiments, the processing circuitry may be further configured to determine that the wireless device is maximum power limited, and the processing circuitry configured to determine whether to accumulate the received TPC command may be further configured to: determine whether the received TPC command is positive or negative; and perform one of: refrain from accumulating the received TPC command in response to a determination that the received TPC command is positive; and accumulate the received TPC command in response to a determination that the received TPC command is negative.

In certain embodiments, the processing circuitry may be further configured to determine that the wireless device is minimum power limited, and the processing circuitry configured to determine whether to accumulate the received TPC command may be further configured to: determine whether the received TPC command is positive or negative; and perform one of: refrain from accumulating the received TPC command in response to a determination that the received TPC command is negative; and accumulate the received TPC command in response to a determination that the received TPC command is positive.

In certain embodiments, the wireless device may be configured with two power control loops, each of the configured power control loops associated with a different closed loop. The processing circuitry configured to obtain the indication may be further configured to receive a power control loop index indicating that the received TPC command applies to a first power control loop of the configured two power control loops. The processing circuitry may be further configured to determine whether the one or more conditions are fulfilled based on one or more parameters related to the first power control loop.

In certain embodiments, the processing circuitry may be configured to receive the TPC command via an UL grant. In certain embodiments, the processing circuitry may be configured to receive the power control loop index via an uplink. In certain embodiments, the processing circuitry may be configured to receive the power control loop index implicitly. In certain embodiments, the processing circuitry may be configured to receive the power control loop index explicitly.

In certain embodiments, the wireless device may be configured with at least three power control loops, each power control loop associated with one of two closed loops, such that at least two of the three configured power control loops are associated with a first closed loop of the two closed loops. The processing circuitry configured to obtain the indication may be further configured to receive a closed loop index indicating that the received TPC command applies to all configured power control loops that are associated with the first closed loop of the two closed loops. The processing circuitry may be further configured to determine whether the one or more conditions are fulfilled based on one or more parameters related to at least one of the configured power control loops associated with the first closed loop.

In certain embodiments, the processing circuitry may be configured to receive the TPC command as part of one or more TPC commands sent to a group of wireless devices. In certain embodiments, the processing circuitry may be configured to receive the TPC command in a PDCCH DCI without an associated UL grant.

In certain embodiments, the one or more conditions may be a function of the closed loop index. In certain embodiments, the one or more conditions may comprise a function depending on more than one power control loop. In certain embodiments, the one or more conditions may comprise a condition that all power control loops associated with the received closed loop index must be considered power limited in order to determine that the wireless device is power limited. In certain embodiments, the one or more conditions may comprise a condition that at least one power control loop associated with the received closed loop index must be considered power limited in order to determine that the wireless device is power limited. In certain embodiments, the one or more conditions may comprise a condition that all power control loops must be considered power limited in order to determine that the wireless device is power limited. In certain embodiments, the one or more conditions may comprise a condition that at least one power control loop must be considered power limited in order to determine that the wireless device is power limited.

In certain embodiments, the processing circuitry may be further configured to determine whether a power control loop of the plurality of power control loops is classified as power limited. In certain embodiments, the processing circuitry may be further configured to determine whether the power control loop of the plurality of power control loops is classified as power limited based on a non-virtual output power. In certain embodiments, the processing circuitry may be further configured to determine whether the power control loop of the plurality of power control loops is classified as power limited based on a virtual output power. In certain embodiments, the processing circuitry may be further configured to determine whether the power control loop of the plurality of power control loops is classified as power limited based on a PUCCH transmission power. In certain embodiments, the processing circuitry may be further configured to determine whether the power control loop of the plurality of power control loops is classified as power limited not based on a PUCCH transmission power.

In certain embodiments, the plurality of power control loops comprises one or more of: one or more PUCCH power control loops; one or more SRS power control loops; and one or more PUSCH power control loops. In certain embodiments, power limited may comprise one or more of: maximum power limited; and minimum power limited.

Also disclosed is a computer program, the computer program comprising instructions configured to perform the above-described method in a wireless device.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a wireless device.

Certain embodiments of the present disclosure may provide one or more technical advantages. As one example, certain embodiments may advantageously enable a wireless device configured with multiple closed loops to unambiguously identify whether it is maximum/minimum power limited or not. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
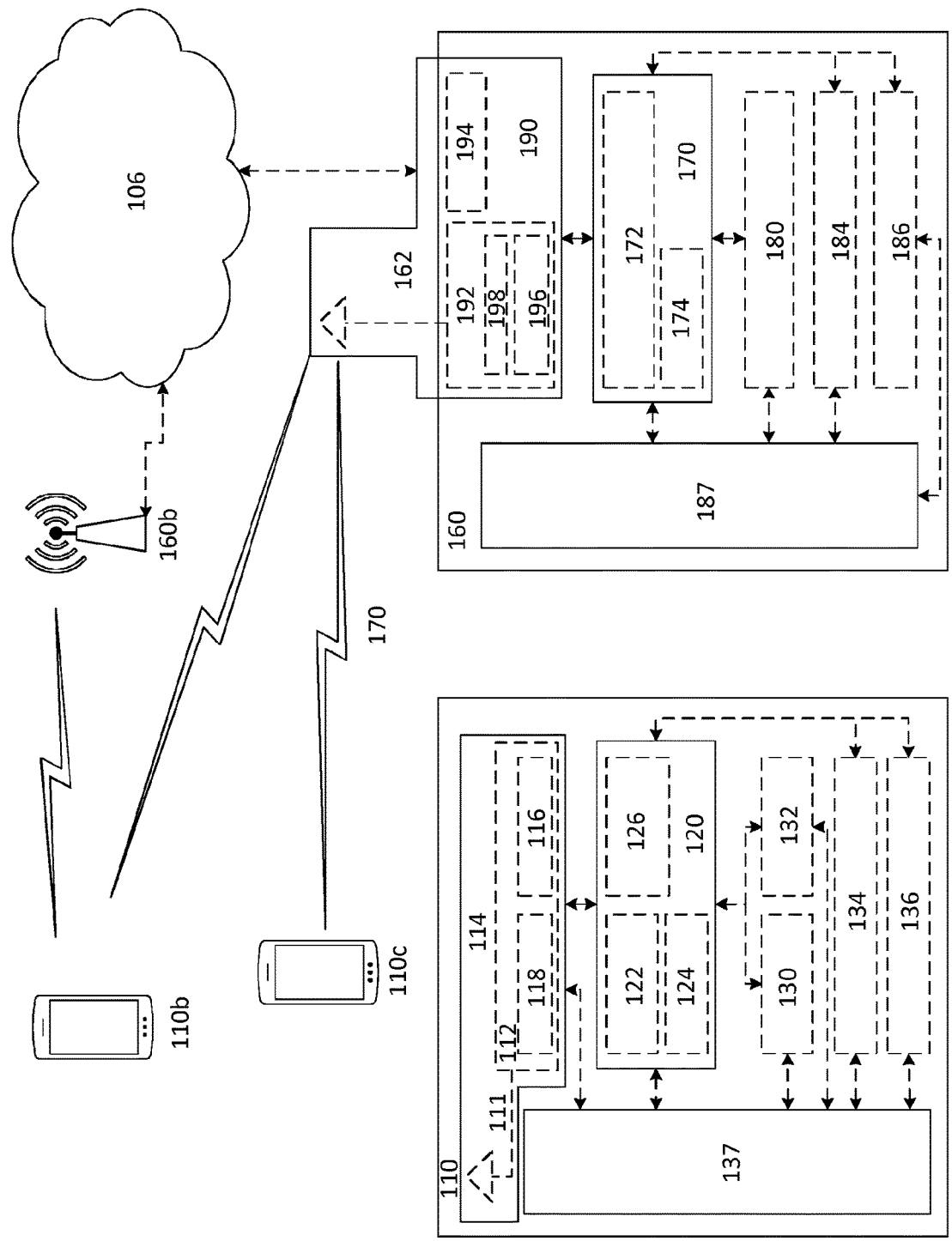
FIG. 1 illustrates an example wireless communications network, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Note that although terminology from 3GPP LTE has been used in this disclosure, this should not be seen as limiting the scope of the invention to only the aforementioned system. Other wireless systems, especially 5G/NR, WCDMA, WiMax, UMB and GSM, may also benefit from exploiting the ideas covered within this disclosure.

As described above, there currently exist certain challenges with respect to power control in NR systems. When a set of TPC commands are received by a UE and the closed loop power control operates in accumulated mode, if a UE has reached maximum (or minimum) power, the positive (or negative) TPC commands will not be accumulated further. In NR, however, the UE can be configured to have N=2 closed loops for PUSCH for a given serving cell. Multiple power control loops may use a given closed loop. Given this, when a TPC command is received by the UE (e.g., using the group-based approach described above in section 1.3.2), it is not trivial to decide whether a UE has reached maximum (or minimum) power or not. Indeed, it may be that some power control loops correspond to maximum (or minimum) power whereas some do not.

Certain aspects of the present disclosure and their embodiments may provide solutions to these or other challenges. In certain embodiments, whether a UE is maximum (or minimum) power limited or not may be determined by having a function taking all, or potentially a subset of all, defined power control loops and then, based on the states of these, define if the UE should be considered maximum (or minimum) power limited or not. For a UE configured with multiple closed loops, certain embodiments may advantageously enable the UE to unambiguously identify whether it is maximum (or minimum) power limited or not.

There are, proposed herein, various embodiments which address one or more of the issues disclosed herein. According to one example embodiment, a method performed by a wireless device (e.g., a UE) for determining whether the wireless device is power limited is disclosed. The wireless device receives, from a network node, a TPC command for one or more of a plurality of power control loops configured at the wireless device. The wireless device obtains an indication of the one or more of the plurality of power control loops to which the received TPC command applies. The wireless device determines, based on the obtained indication, whether one or more conditions related to power control at the wireless device are fulfilled. The wireless device determines whether the wireless device is power limited based on whether the one or more conditions are fulfilled.

In certain embodiments, the indication may be (or include) at least one parameter associated with the one or more of the plurality of power control loops configured at the wireless device. In certain embodiments, in response to determining that the wireless device is not power limited, the wireless device may accumulate the received TPC command. In certain embodiments, in response to determining that the wireless device is power limited, the wireless device may determine whether to accumulate the received TPC command.

In certain embodiments, the wireless device may determine that the wireless device is maximum power limited. The wireless device may determine whether to accumulate the received TPC command by determining whether the received TPC command is positive or negative and perform one of: in response to determining that the received TPC command is positive, refrain from accumulating the received TPC command; and in response to determining that the received TPC command is negative, accumulate the received TPC command. In certain embodiments, the wireless device may determine that the wireless device is minimum power limited. The wireless device may determine whether to accumulate the received TPC command by determining whether the received TPC command is positive or negative and perform one of: in response to determining that the received TPC command is negative, refrain from accumulating the received TPC command; and in response to determining that the received TPC command is positive, accumulate the received TPC command.

In certain embodiments, there is at least one of the following conditions: a boolean condition describing when the wireless device should upper limit accumulation of TPC commands; and a boolean condition describing when the wireless device should lower limit accumulation of TPC commands. The condition may be a function of a closed loop index (e.g . . . 1). The condition may be a function depending on more than one power control loop. The condition may state that all power control loops corresponding to closed loop index should be considered power limited in order for the condition to be fulfilled. The condition may state that at least one power control loop corresponding to the closed loop index should be considered power limited in order for the condition to be fulfilled. The condition may state that all power control loop should be considered power limited in order for the condition to be fulfilled. A power control loop may be classified as power limited or not based on non-virtual or virtual output power. A PUSCH power control loop may be classified as power limited or not taking or not taking PUCCH transmission power into account. The condition may involve both SRS and PUSCH power control loops.

Certain embodiments may provide one or more of the following technical advantage(s). For a UE configured with multiple closed loops, the proposed approaches may help the UE unambiguously identify whether it is maximum/minimum power limited or not. Other advantages may be readily apparent to one having skill in the art. Certain embodiments may have none, some, or all of the recited advantages.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 illustrates an example wireless communications network, in accordance with certain embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

In certain embodiments, a WD, such as WD 110 in the example of FIG. 1, receives (e.g., from a network node, such as network node 160 in the example of FIG. 1) a TPC command for one or more of a plurality of power control loops configured at WD 110. The plurality of power control loops may include one or more of: one or more PUCCH power control loops; one or more SRS power control loops; and one or more PUSCH power control loops. In certain embodiments, power limited may be one or more of maximum power limited and minimum power limited.

WD 110 may receive the TPC command in any suitable manner. As one example, WD 110 may receive the TPC command via an UL grant. As another example, in certain embodiments WD 110 may receive the TPC command via one of DCI formats 0, 1, 2, and 4 (or via an analogous format of a different RAT, such as NR). As another example, in certain embodiments, WD 110 may receive the TPC command via one of DCI formats 3 and 3A (or via an analogous format of a different RAT, such as NR). As still another example, in certain embodiments WD 110 may receive the TPC command as part of one or more TPC commands sent to a group of wireless devices. As yet another example, in certain embodiments WD 110 may receive the TPC command in a PDCCH DCI without an associated UL grant.

WD 110 obtains an indication of the one or more of the plurality of power control loops to which the received TPC command applies. In certain embodiments, the indication may comprise at least one parameter associated with the one or more of the plurality of power control loops configured at WD 110. As one example, in certain embodiments the indication of the one or more of the plurality of power control loops to which the received TPC command applies may be a power control loop index (e.g., k) indicating that the received TPC command applies to a first power control loop of two configured power control loops. As another example, in certain embodiments the indication of the one or more of the plurality of power control loops to which the received TPC command applies may be a closed loop index (e.g., 1) indicating that the received TPC command applies to all configured power control loops that are associated with a first closed loop of two closed loops.

WD 110 determines, based on the obtained indication, whether one or more conditions related to power control at WD 110 are fulfilled. WD 110 determines whether WD 110 is power limited based on whether the one or more conditions are fulfilled. In certain embodiments, in response to determining that WD 110 is not power limited, WD 110 may accumulate the received TPC command. In certain embodiments, in response to determining that WD 110 is power limited, WD 110 may determine whether to accumulate the received TPC command. Note that as used in the present disclosure, "in response to" can be (but is not required to be) interpreted as "upon." For example, in certain embodiments, WD 110 may accumulate the received TPC upon determining that WD 110 is not power limited. As another example, in certain embodiments WD 110 may determine whether to accumulate the received TPC command upon determining that WD 110 is power limited.

In certain embodiments, there is at least one of the following conditions: a boolean condition describing when WD 110 should upper limit accumulation of TPC commands, and a boolean condition describing when WD 110 should lower limit accumulation of TPC commands. In some cases, the condition may be a function of a closed loop index (e.g., 1 as described in more detail below). In some cases, the condition may be a function depending on more than one power control loop. In some cases, the condition may state that all power control loops corresponding to the closed loop (e.g., 1) should be consided power limited in order for the condition to be fulfilled. In some cases, the condition may state that at least one power control loop corresponding to the closed loop index should be consided power limited in order for the condition to be fulfilled. In some cases, the condition may state that all power control loops should be considered power limited in order for the condition to be fulfilled. In some cases, the condition may involve both SRS and PUSCH power control loops.

In certain embodiments, WD 110 may determine whether a power control loop of the plurality of power control loops is classified as power limited. WD 110 may determine whether a power control loop of the plurality of power control loops is classified as power limited in any suitable manner. As one example, in certain embodiments WD 110 may determine whether the power control loop of the plurality of power control loops is classified as power limited based on a non-virtual output power. As another example, in certain embodiments, WD 110 may determine whether the power control loop of the plurality of power control loops is classified as power limited based on a virtual output power.

In certain embodiments, WD 110 may determine whether the power control loop of the plurality of power control loops is classified as power limited based on a PUCCH transmission power. In certain embodiments, WD 110 may determine whether the power control loop of the plurality of power control loops is classified as power limited not based on a PUCCH transmission power. For example, a PUSCH power control loop may be classified as power limited or not taking or not taking PUCCH transmission power into account.

In certain embodiments, determining whether WD 110 is power limited may result in a determination that WD 110 is maximum power limited. In such a scenario, WD 110 may determine whether to accumulate the received TPC command. For example, in certain embodiments WD 110 may determine whether the received TPC command is positive or negative. In response to determining that the received TPC command is positive, WD 110 may refrain from accumulating the received TPC command. In response to determining that the received TPC command is negative, WD 110 may accumulate the received TPC command.

In certain embodiments, determining whether WD 110 is power limited may result in a determination that WD 110 is minimum power limited. In such a scenario, WD 110 may determine whether to accumulate the received TPC command. For example, WD 110 may determine whether the received TPC command is positive or negative. In response to determining that the received TPC command is negative, WD 110 may refrain from accumulating the received TPC command. In response to determining that the received TPC command is positive. WD 110 may accumulate the received TPC command.

In certain embodiments, WD 110 may be configured with two power control loops. Each of the configured power control loops may be associated with a different closed loop. In certain embodiments, the indication of the one or more of the plurality of power control loops to which the received TPC command applies obtained by WD 110 may be a power control loop index indicating that the received TPC command applies to a first power control loop of the configured two power control loops. In certain embodiments, WD 110 may obtain the indication of the one or more of the plurality of power control loops to which the received TPC command applies by, for example, receiving the indication from network node 160. In such a scenario, the determination of whether the one or more conditions are fulfilled may be based on one or more parameters related to the first power control loop. In certain embodiments, WD 110 may receive the power control loop index implicitly. In certain embodiments, WD 110 may receive the power control loop index explicitly.

To illustrate, consider a first example embodiment in which WD 110 is configured with 2 closed loops for transmit power control for PUSCH transmissions on a first serving cell c (e.g., f1_c( ) and f2_c( ). When WD 110 receives a PDCCH with a DCI associated with an UL grant, the open and closed loop (hence (j,q,l)) to use for setting the transmit power of the PUSCH transmission corresponding to the UL grant can be based on explicit DCI bits indicating the specific open and closed loop to use, or implicitly based on the beam/QCL configuration associated with the PUSCH transmission (e.g., as described in U.S. Provisional Patent Application No. 62/557,018 filed on Sep. 11, 2017, entitled "Beam Indication for UL Power Control," re-filed as International Patent Application No. PCT/IB2018/056935 on Sep. 11, 2018, and U.S. Provisional Patent Application No. 62/556,940, filed on Sep. 11, 2017, entitled "Unified UL and DL Beam Indication," re-filed as International Patent Application No. PCT/IB2018/056888 on Sep. 10, 2018, both of which are hereby incorporated by reference in their entirety. In certain embodiments, the TPC command included in the PDCCH DCI can be used to update the state of the determined closed loop. In case of accumulated mode, this may correspond to:

$$fc(i,l)=fc(i-1,l)+\delta_{PUSCH,c}(i-K_{PUSCH}).$$

However, special attention needs to be given to the cases that WD 110 is maximum or minimum power limited. As used herein, WD 110 may be "power limited" when one or more conditions related to power control at the wireless device are fulfilled. In some cases, WD 110 (with multiple power control loops) may be considered "power limited" in the context of the present disclosure even if it still has the ability to transmit using other (j, q, l) values.

In case WD 110 is maximum power limited, for instance in the sense that $P_{PUSCH,c}^{unlim}(i, j, q, l) > P^{CMAX,c}(i)$, WD 110 may choose to not apply the accumulation for positive values of $\delta_{PUSCH,c}(i-K_{PUSCH})$. Hence, in such a case the equation $fc(i,l)=fc(i-1,l)$ if $\delta_{PUSCH,c}(i-K_{PUSCH}) > 0$ can be used.

In a similar fashion, there may also be a lower limit defined such that if $P_{PUSCH,c}^{unlim}(i, j, q, l) < 0$, WD 110 chooses not to accumulate negative TPC values. Hence, in such a case the equation $fc(i,l)=fc(i-1,l)$ if $\delta_{PUSCH,c}(i-K_{PUSCH}) < 0$ can be used.

To summarize, in certain embodiments the accumulation functions can be given as:

$$fc(i,l)=fc(i-1,l)$$

if power_max limited and $\delta_{PUSCH,c}(i-K_{PUSCH}) > 0$ $$fc(i,l)=fc(i-1,l)$$

if power_max limited and $\delta_{PUSCH,c}(i-K_{PUSCH}) < 0$ $$fc(i,l)=fc(i-1,l)+\delta_{PUSCH,c}(i-K_{PUSCH})$$

otherwise
where $$\text{power\_max\_limited}(j, q, l) = \begin{cases} \text{true} & \text{if } P_{PUSCH,c}^{unlim}(i, j, q, l) > P_{CMAX,c}(i) \\ \text{false otherwise.} \end{cases}$$

$$\text{power\_min\_limited}(j, q, l) = \begin{cases} \text{true} & \text{if } P_{PUSCH,c}^{unlim}(i, j, q, l) < P_{MIN} \\ \text{false otherwise.} \end{cases}$$

Note that the value of $P_{MIN}$ may be determined in a variety of ways. For example, in certain embodiments $P_{MIN}$ may be defined in a specification (e.g., RAN4). As another example, in certain embodiments $P_{MIN}$ may be defined as 0. As still another example, in certain embodiments $P_{MIN}$ may be defined by WD 110.

Figure 2:
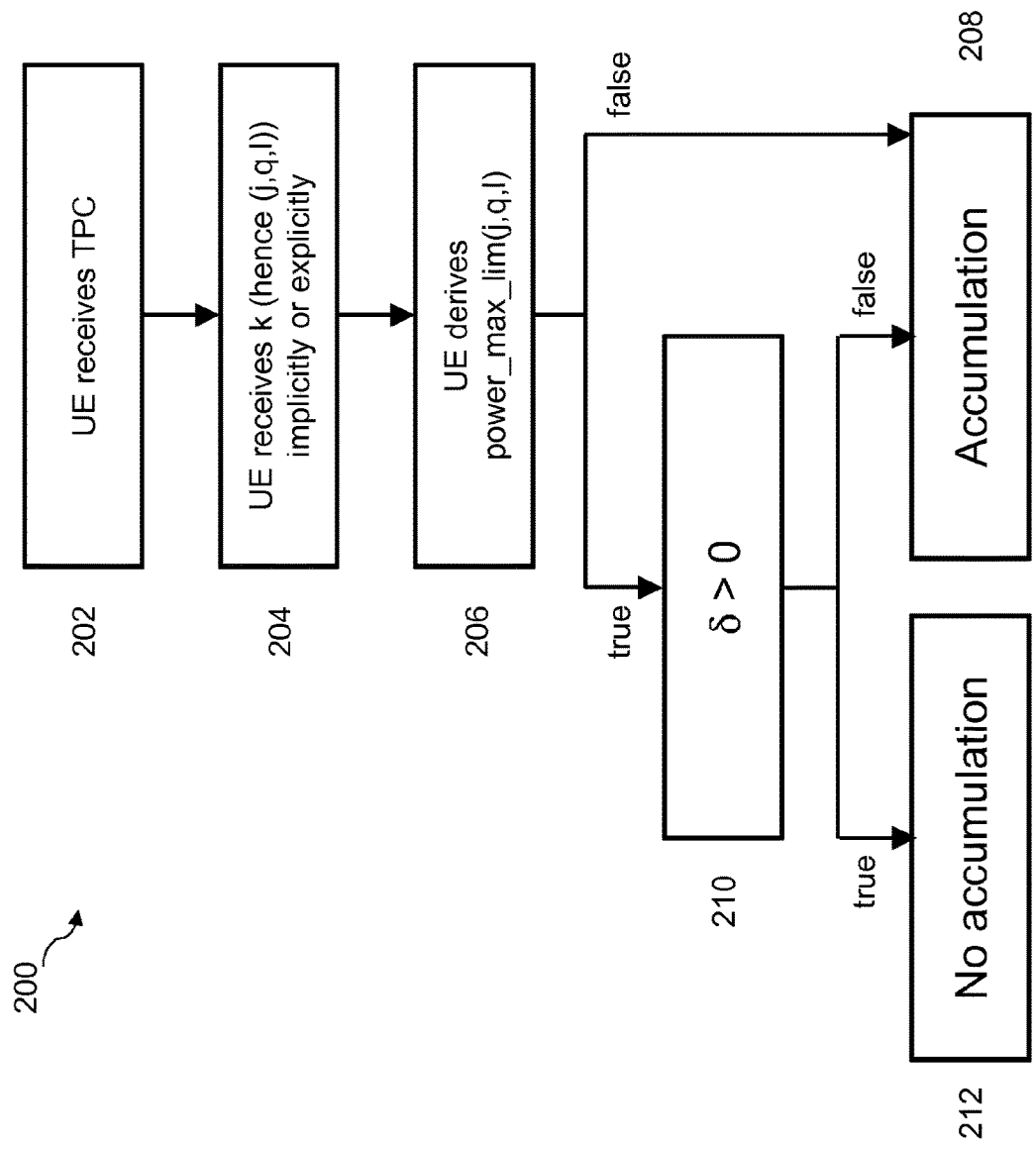
FIG. 2 illustrates an example method in a UE, in accordance with certain embodiments.

FIG. 2 illustrates an example method 200 in a UE, in accordance with certain embodiments. At step 202, the UE receives a TPC command. In certain embodiments, the UE may be configured with two closed loops for transmit power control for, for example, PUSCH transmissions on a first serving cell. At step 204, the UE receives a power control loop index k (hence, j, q, l) implicitly or explicitly (for example as described above in relation to FIG. 1). In certain embodiments, k may be received as part of an individual TPC command in an UL grant. For example, k may be received via one of DCI formats 0, 1, 2, & 4 in LTE. As another example, in certain embodiments the power control loop index (e.g., k) may be received via an analogous format of a different radio access technology (RAT), such as NR. As described in more detail below in relation to FIGS. 1 and 3, in certain embodiments a closed loop index I may be received. In some cases, the closed loop index 1 may be received via an analogous format of a different RAT, such as NR.

At step 206, the UE derives power_max_lim(j,q,l). Note that although the example of FIG. 2 illustrates a determination of power_max_lim(j,q,l), a determination for power_min_lim(j,q,l) may be performed in a similar manner as described above in relation to FIG. 1.

If at step 206 the UE determines that the UE is not maximum power limited, the method proceeds to step 208 and the UE continues to accumulate. If, however, at step 206 the UE determines that it is maximum power limited, at step 210 the UE determines whether the value of δ (e.g., the TPC command) is greater than zero (i.e., positive or negative). If at step 210 the UE determines that the value of δ is greater than zero (i.e., positive), then the method proceeds to step 212 and the UE does not apply accumulation for positive values of δ. If, however, at step 110 the UE determines that δ is less than zero (i.e., negative), then the method proceeds to step 208 and the UE continues to accumulate.

Returning to FIG. 1, as noted above, WD 110 can also receive TPC commands in PDCCH DCI without an associated UL grant, for example using a DCI format similar to LTE DCI format 3/3A (e.g., an analogous format of a different RAT, such as NR). In such cases, the closed loop to which the TPC command applies can be determined using one or more of the approaches described in U.S. Provisional Patent Application No. 62/567,044, filed on Oct. 2, 2017, entitled "TPC Command Indication for Multiple Closed Loops," re-filed as International Patent Application No. PCT/SE2018/050941 on Sep. 17, 2018, which is hereby incorporated by reference in its entirety. Furthermore, whether to apply accumulation or not may be decided by one or more of the example embodiments described below.

In certain embodiments, WD 110 may be configured with at least three power control loops. Each power control loop may be associated with one of two closed loops, such that at least two of the three configured power control loops are associated with the same closed loop (e.g., a first closed loop of the two closed loops). In certain embodiments, the indication of the one or more of the plurality of power control loops to which the received TPC command applies obtained by WD 110 may be a closed loop index (e.g., 1) indicating that the received TPC command applies to all configured power control loops that are associated with the first closed loop of the two closed loops. In certain embodiments, WD 110 may obtain the indication of the one or more of the plurality of power control loops to which the received TPC command applies by, for example, receiving the indication from network node 160. In such a scenario, the determination of whether the one or more conditions are fulfilled may be based on one or more parameters related to at least one of the configured power control loops associated with the first closed loop.

In certain embodiments, the received TPC command may be received as part of one or more TPC commands sent to a group of WDs. In certain embodiments, the received TPC command may be received in a PDCCH DCI without an associated UL grant. In certain embodiments, the one or more conditions may be a function of the closed loop index. In certain embodiments, the one or more conditions may comprise a function depending on more than one power control loop.

In certain embodiments, the one or more conditions may include a condition that all power control loops associated with the received closed loop index must be considered power limited in order to determine that WD 110 is power limited. In certain embodiments, the one or more conditions may include a condition that at least one power control loop associated with the received closed loop index must be considered power limited in order to determine that WD 110 is power limited. In certain embodiments, the one or more conditions may include a condition that all power control loops must be considered power limited in order to determine that WD 110 is power limited. In certain embodiments, the one or more conditions may include a condition that at least one power control loop must be considered power limited in order to determine that WD 110 is power limited.

To illustrate, consider a second example embodiment in which a set of power control loops k=1, 2, 3 have been defined and corresponds to the settings (j,q,l) according to Table 2 below for WD 110.

TABLE 2

| k | j | q | l |
|---|---|---|---|
| 1 | 1 | 1 | 1 |
| 2 | 1 | 2 | 1 |
| 3 | 1 | 1 | 2 |

If a TPC command in PDCCH DCI without an associated UL grant (e.g., using a DCI format similar to LTE DCI format 3/3A) is given that updates the closed loop f(i, 2) (i.e., l=2), WD 110 will implicitly know that (j,q,l)=(1,1,2) since there is only one power control loop using 1-2 in this particular configuration. WD 110 may thus utilize this and use the same limitation conditions as in the first example embodiment described above, hence:

$$\text{power\_max\_limited}(j, q, l) = \begin{cases} \text{true} & \text{if } P_{PUSCH,c}^{unlim}(i, 1, 1, 2) > P_{CMAX,c}(i) \\ \text{false} & \text{otherwise.} \end{cases}$$

$$\text{power\_min\_limited}(j, q, l) = \begin{cases} \text{true} & \text{if } P_{PUSCH,c}^{unlim}(i, 1, 1, 2) < P_{MIN} \\ \text{false} & \text{otherwise.} \end{cases}$$

However, if instead a TPC is given corresponding to the closed loop f(i,l) (i.e., l=1) the values of (j,q,l) are not implicitly given since both power control loop (j,q,l)=(1,1,1) and (j,q,l)-(1,2,1) uses l=1. WD 110 will, however, be able to know the set of power control loops using the closed loop l=1. In certain embodiments, WD 110 may require that all the power control loops within this set should be power limited in order to consider WD 110 power limited and hence limit the accumulation for l=1.

In more general terms, for a given WD, the set of power control loops can be defined using the closed loop $l=l_0$ as $S_{l_0}=\{(j,q,l):l=l_0\}$, hence all defined combinations of (j,q,l) where $l=l_0$. In certain embodiments, the limitation conditions power_max_limited and/or power_min_limited are functions defined from these sets. The accumulation functions may thus be defined as:

$fc(i,l_0)=fc(i-1,l_0)$ if power_max_limited($l_0$) and $\delta_{PUSCH,c}(i-K_{PUSCH})>0$ $fc(i,l_0)=fc(i-1,l_0)$ if power_max_limited($l_0$) and $\delta_{PUSCH,c}(i-K_{PUSCH})<0$ $fc(i,l_0)=fc(i-1,l_0)+\delta_{PUSCH,c}(i-K_{PUSCH})$ otherwise
where power_max_limited ($l_0$) =

$$\begin{cases} \text{true} & \text{if } P_{PUSCH,c}^{unlim}(i, j, q, l) > P_{CMAX,c}(i) \text{ for all } (j, q, l) \in S_{l_0} \\ \text{false otherwise.} \end{cases}$$

power_min_limited ($l_0$) =

$$\begin{cases} \text{true} & \text{if } P_{PUSCH,c}^{unlim}(i, j, q, l) < P_{MIN} \text{ for all } (j, q, l) \in S_{l_0} \\ \text{false otherwise.} \end{cases}$$

meaning that the power limitation condition is applied to all power control loops that use the closed loop $l_0$. Hence, it will be possible that a TPC command relating to l=1 would correspond to limiting accumulation on the closed loop l=1 whereas a TPC command relating to l=2 would not limit accumulation.

In certain embodiments, the limitation conditions below could be applied power_max_limited $(l_0) =$ $$\begin{cases} \text{true} & \text{if } P_{PUSCH,c}^{unlim}(i, j, q, l) > P_{CMAX,c}(i) \text{ for some } (j, q, l) \in S_{l_0} \\ \text{false otherwise} \end{cases}$$

power_min_limited $(l_0) =$ $$\begin{cases} \text{true} & \text{if } P_{PUSCH,c}^{unlim}(i, j, q, l) < P_{MIN} \text{ for some } (j, q, l) \in S_{l_0} \\ \text{false otherwise.} \end{cases}$$

meaning that if one power control loop using $l_0$ is considered power limited then the closed loop $l_0$ would limit accumulation.

Figure 3:
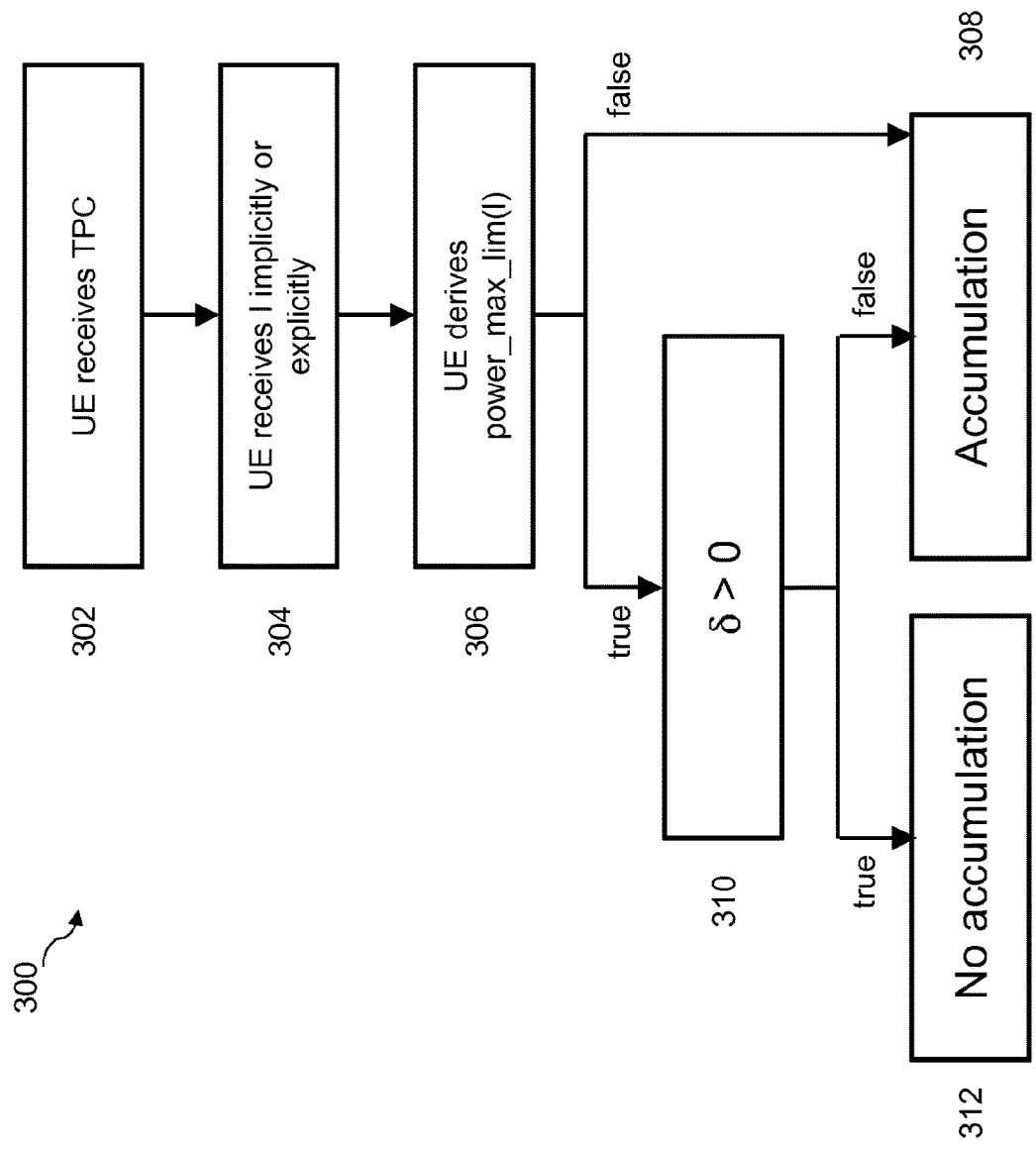
FIG. 3 illustrates another example method in a UE, in accordance with certain embodiments.

FIG. 3 illustrates another example method 300 in a UE, in accordance with certain embodiments. At step 302, the UE receives a TPC command. In certain embodiments, the UE may be configured with more than 2 closed loops for transmit power control for, for example, PUSCH transmissions on a first serving cell. At step 304, the UE receives l implicitly or explicitly. In certain embodiments, l may be received as part of one or more TPC commands sent to a group of UEs (e.g . . . using one PDCCH addressed to the group). As one example, l may be received via one of DCI formats 3 & 3A in LTE. As another example, l may be received via an analogous format of a different RAT, such as NR.

At step 306, the UE derives power_max_lim(l). Note that although the example of FIG. 3 illustrates a determination of power_max_lim(l), a determination for power_min_lim(j, q,l) may be performed in a similar manner as described above in relation to FIG. 1.

If at step 306 the UE determines that the UE is not maximum power limited, method 300 proceeds to step 308 and the UE continues to accumulate. If, however, at step 306 the UE determines that it is maximum power limited, at step 310 the UE determines whether the value of δ (e.g., the TPC command) is greater than zero (i.e., positive or negative). If at step 310 the UE determines that the value of δ is greater than zero (i.e., positive), then method 300 proceeds to step 312 and the UE does not apply accumulation for positive values of δ. If, however, at step 310 the UE determines that δ is less than zero (i.e., negative), then method 300 procceds to step 308 and the UE continues to accumulate.

Returning to FIG. 1, according to a third example embodiment the following limitation conditions can be applied:

power_max_limited $(j, q, l) =$ $$\begin{cases} \text{true} & \text{if } P_{PUSCH,c}^{unlim}(i, j, q, l) > P_{CMAX,c}(i) \text{ for some } (j, q, l) \\ \text{false otherwise} \end{cases}$$

power_min_limited $(j, q, l) =$ $$\begin{cases} \text{true} & \text{if } P_{PUSCH,c}^{unlim}(i, j, q, l) < P_{MIN} \text{ for some } (j, q, l) \\ \text{false otherwise.} \end{cases}$$

meaning that if all power control loops used by WD 110 are considered power limited, then WD 110 would limit accumulation for all closed loops.

Figure 4:
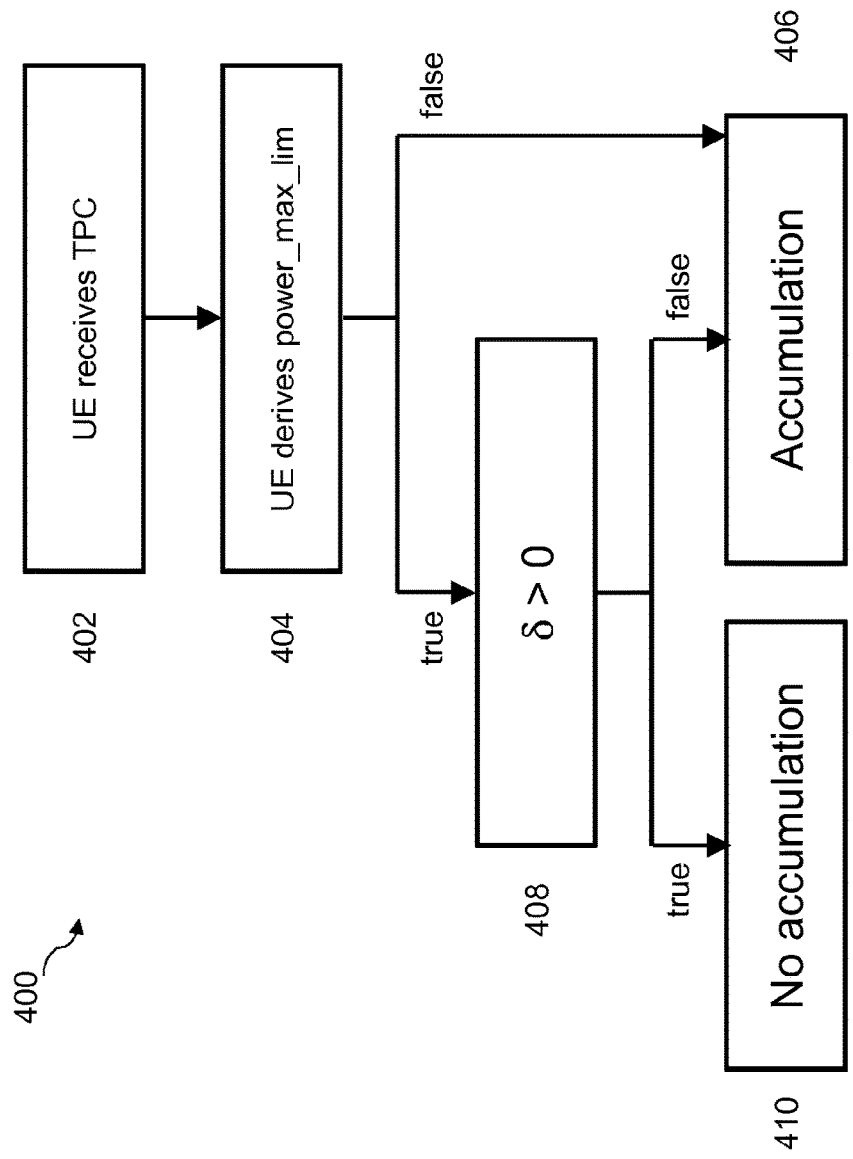
FIG. 4 illustrates another example method in a UE, in accordance with certain embodiments.

FIG. 4 illustrates another example method 400 in a UE, in accordance with certain embodiments. At step 402, the UE receives a TPC command. In certain embodiments, the UE may be configured with more than 2 closed loops for transmit power control for, for example, PUSCH transmissions on a first serving cell. At step 404, the UE derives power_max_lim. Note that although the example of FIG. 4 illustrates a determination of power_max_lim, a determination for power_min_lim may be performed in a similar manner as described above in relation to FIG. 1.

If at step 404 the UE determines that the UE is not maximum power limited, method 400 procceds to step 406 and the UE continues to accumulate. If, however, at step 404 the UE determines that it is maximum power limited, at step 408 the UE determines whether the value of δ (e.g., the TPC command) is greater than zero (i.e., positive or negative). If at step 408 the UE determines that the value of δ is greater than zero (i.e., positive), then method 400 proceeds to step 410 and the UE does not apply accumulation for positive values of δ. If, however, at step 408 the UE determines that δ is less than zero (i.e., negative), then method 400 proceeds to step 406 and the UE continues to accumulate.

Returning to FIG. 1, WD 110 may determine whether a power control loop of the plurality of power control loops is classified as power limited in any suitable manner. As one example, in certain embodiments WD 110 may determine whether the power control loop of the plurality of power control loops is classified as power limited based on a non-virtual output power. As another example, in certain embodiments, WD 110 may determine whether the power control loop of the plurality of power control loops is classified as power limited based on a virtual output power.

To illustrate, consider a fourth example embodiment in which WD 110 is not currently transmitting PUSCH. In such a scenario, the power limitation condition may then be derived from the virtual output power given as $$P_{PUSCH,c}^{unlim}(i,j,q,l) = P_{0,PUSCH}(j) + \alpha_c(j)PL_c(q) + fc(i,l)$$

and this output could be used in the operation $p_{PUSCH,c}^{unlim}(i,j,q,l) > P_{CMAX,c}(i)$. Other embodiments are $$P_{PUSCH,c}^{unlim}(i,j,q,l) = P_{0,PUSCH}(j) + \alpha_c(j)PL_c(q) + 10 \log_{10} M_{PUSCH,c}(i) + V_{TF,c}(i) + fc(i,l), - P_{PUCCH}^{kPUCCH}(i)$$

and $$P_{PUSCH,c}^{unlim}(i,j,q,l) = P_{0,PUSCH}(j) + \alpha c(j)PL_c(q) + fc(i,l) - P_{PUCCH}^{kPUCCH}(i)$$

which represents non-virtual and virtual output power respectively taking a simultaneous transmission of PUCCH into account.

Although certain example embodiments described above related to PUSCH, the present disclosure is not limited to the above-described example embodiments. Rather, the present disclosure contemplates that the various embodiments described herein are applicable to other suitable scenarios. For example, the various embodiments described herein are equally applicable to PUCCH and SRS. To illustrate, consider a fifth example embodiment in which the closed loops fc(i,1) are shared between PUSCH and SRS. Hence, there will be one set of PUSCH power control loops using the closed loop $l_0$ (denoted as $S_{l_0}^{PUSCH}$) and there will be one set of SRS power control loos using the closed loop $l_0$ (denoted as $S_{l_0}^{SRS}$). The power limitation conditions may then be given as a joint condition on $P_{PUSCH,c}^{unlim}(i,j,q,l)$ and $P_{SRS,c}^{unlim}(i, j, q, l)$ is defined in an analogous way to $P_{PUSCH,c}^{unlim}(i,j,q,l)$. Furthermore, power_max_limited($l_0$) may then be defined as:

power_max_limited($l_0$)=power_max_limited_PUSCH ($l_0$) and power_max_limited_SRS($l_0$)

power_max_limited_PUSCH($l_0$) =

$$\begin{cases} \text{true if } P_{PUSCH,c}^{unlim}(i, j, q, l) > P_{CMAX,c}(i) \text{ for all } (j, q, l) \in S_{l_0}^{PUSCH} \text{ and} \\ \text{false otherwise.} \end{cases}$$

power_min_limited_SRS($l_0$) =

$$\begin{cases} \text{true if } P_{PUSCH,c}^{unlim}(i, j, q, l) > P_{CMAX,c}(i) \text{ for all } (j, q, l) \in S_{l_0}^{SRS} \text{ and} \\ \text{false otherwise.} \end{cases}$$

The following section illustrates an example approach to how one or more of the above-described embodiments may be implemented into a standard. The description below reflects one possible approach, and the present disclosure is not limited to the examples described below. Modifications, additions, or omissions may be made to the example approach described below without departing from the scope of the present disclosure.

In RAN1 #90bis a number of agreements were made on closed loop power control. Still, since new features are introduced in NR that will have implications on the closed loop part of NR's UL power control, further details needs to be considered. For example, with respect to implicit reset of the closed loop power control part, it was agreed at RAN1 #90bis that for closed loop power control process, f(i) in case of accumulative TPC command mode can be reset by RRC reconfiguration of P_0 and alpha. The agreement states that (similar to LTE) a reconfiguration of P_0 and/or alpha may result in a reset of the accumulated closed loop power control process. However, since there will be support in NR for multiple closed loops the exact meaning of this agreement needs to be clarified further. For instance, given the support of beam-specific power control it is possible to modify and/or add new power control loops that rely on a closed loop fc(i,1) already used by another power control loop. In such a case it would hence be directly inappropriate to reset the closed loop fc(i,1) since it would also affect other power control loops. For example, assume that the 3 power control loops b=1, 2 and 3 have been defined according to Tables 2-4 below. If P0_1, corresponding to j=2, were reconfigured it would be inappropriate to reset fc(i,1) since this closed loop also is used by power control loop b=1. It would also be inappropriate to reset fc(i,2), if reconfiguring P0_1, since this closed loop is related to another beam, hence fc(i,2) does not relate to j=2.

Tables 2-4. The configuration of three power control loops represented by b=1,2 and 3.

TABLE 2

| b | j |
|---|---|
| 1 | P0_2, alpha2 |
| 2 | P0_1, alpha1 |
| 3 | P0_2, alpha2 |

TABLE 3

| b | k |
|---|---|
| 1 | CSI-RS, CRI=2 |
| 2 | CSI-RS, CRI=2 |
| 3 | SSB |

TABLE 4

| b | l |
|---|---|
| 1 | 1 |
| 2 | 1 |
| 3 | 2 |

Based on this, there are multiple options for interpreting the above-described agreement. A first option (Option A) is as follows. In the current draft of 38.213 (v1.1.2_v2) the agreement is captured as A UE shall reset accumulation for a serving cell c
When t $P_{O\_UE\_PUSCH,c}(j)$ value is changed by higher layers;
When $\alpha_c(j)$ value is changed by higher layers;

this could be modified to

A UE shall reset accumulation for a serving cell $_c$ for fc(i,1) and fc(i,2)
When t $P_{O\_UE\_PUSCH,c}(j)$ value is changed by higher layers and num-p0-alpha-sets<2;
When $\alpha_c(j)$ value is changed by higher layers and num-p0-alpha-sets <2;

where num-p0-alpha-sets was defined as: For $j \in (2, \ldots, J-1)=S$, a $P_{O\_NOMINAL\_PUSCH,c}(j)$ value, Applicable for all $j \in s$, is indicated by higher layer parameter p0-nominal-pusch-withgrant for serving cell $_c$ and a set of $P_{O\_UE\_PUSCH,c}(j)$ values are indicated by a set of higher layer parameters p0-ue-pusch-withgrant for serving cell $_c$ where the size of the set is J-2 and is indicated by higher layer parameter num-p0-alpha-sets.

This modification would thus imply that the reset is only carried out if there is only one power control loop defined for grant based UL power control.

A second option (Option B) is as follows. Support higher layer configuration such that the reset by RRC reconfiguration of P_0 and alpha can be activated or deactivated.

A third option (Option C) is as follows. Support higher layer configuration such that when configuring P_0 and alpha a Boolean indicating reset or not reset is also provided.

Thus, the functionality of resetting the accumulative TPC f(i,1) when reconfiguring P_0 and alpha should be i) active only when only one power control loop is defined for grant based PUSCH or, ii) possible to activate or deactivate by higher layer configuration, or iii) explicitly indicated by higher layer when reconfiguring P_0.

With respect to explicit reset of the closed loop power control part, another problem with the closed loop power control in NR is that new features introduced will imply that situations may occur when a TPC command has not been given in a long while. One example is in case an aperiodic SRS has not been triggered and transmitted in a long while. This may imply that the closed loop part is outdated and it would hence be beneficial to do an explicit reset the closed loop part (in case of accumulated mode) instead of using the outdated accumulated value. On the other hand, if the SRS has been transmitted recently we would rather prefer to not reset closed loop part. As another example, the same problem occurs in beam specific power control when the gNB redirects its beam. In this case to closed loop power control part of the beam corresponding to the old direction may be irrelevant for the new propagation environment in case of accumulated mode. Hence, also here it would be beneficial to explicitly reset the closed PC loop part at selected occasions. As still another example, since multiple closed loops are supported in the case of beam-specific power control the situation when a beam has not been used for PUSCH for a long time implies that the closed loop part may be outdated since TPC will be applied to the PC loops used for PUSCH transmissions. Hence, also here it may be motivated to do an explicit reset of the closed loop power control part.

Based on this it is proposed that explicit reset of the closed loop power control part be supported in case of accumulated mode.

With respect to multiple closed loop power control processes for PUSCH, according to the recent agreements a set of PC parameters will for NR be defined and given by the set of indexes {j,k,l} in the case of PUSCH. Here l relates to different closed loop power control processes where fc(i,l) represents a closed loop process which is controlled by signalling from the gNB using the TPC command. Hence, when the gNB sends a TPC command this command needs to be attached and applied to a certain index l, in the case there are more than one closed loop processes defined. Two possible options to do this are described below.

A first option (Option 1) is as follows. Implicitly connect a TPC command to an index/by using the index l used for setting the output power in a PUSCH transmission. Hence, if the current power control is based on the power control set corresponding to indexes {j',k', l'} then the TPC command applies to the closed loop process corresponding to l=l'.

A second option (Option 2) is as follows. Explicitly connect the TPC command to an index l by indicating this index with the TPC command or alternatively provide it in a separate command.

In LTE, there are essentially two ways to transmit a TPC command, UE specific (as in DCI formats 0,1,2 and 4) and group based as in format 3 and 3A. This will be supported also for NR. For example, it was agreed that NR will support closed power control commands by DL DCI for PUCCH power control and by UL grant for PUSCH power control (SRS is for further study). It was also agreed that NR will support closed power control commands by group common DCI with TPC-PUSCH-RNTI, TPC-PUCCH-RNTI, and TPC-SRS-RNTI. These cases are considered below from the perspective of Option 1 versus Option 2.

For the UE specific TPC case, one TPC is received by the UE and since the TPC command generated by the gNB will be based on the UE's current output power setting the TPC will implicitly be related to the current used PC parameters {j',k',l'}. Thus, Option 1 provides sufficient functionality.

For the group-based TPC case, there are two potential approaches. One option (Option 2A) is to configure a UE with two TPC-PUSCH-RNTIs and then connect f(i,1) to TPC-PUSCH-RNTI1 and f(i,2) to TPC-PUSCH-RNTI2. A second option (Option 2B) is that the applicable l is indicated explicitly as part of DCI. Hence, a one bit index is added to every TPC command in DCI 3/3A that indicates the corresponding f(i,1) to which the command applies. Either Option 2A or Option 2B would fulfil the requirements in terms of unambiguously associating a TPC command to a corresponding f(i,1). Option 2B may be more suitable when multiple closed loops are configured to handle multiple beams (e.g., for multi-TRP) while Option 2A is more suitable for differentiating closed loop corrections between grant-based and grant-free PUSCH.

Thus, when the UE is configured with multiple closed loops (f_c(i,1)), 1=1,2, the TPC commands in present in group-based DCI (e.g. similar to LTE 3/3A) should be either explicitly/implicitly associated with one of the closed loops.

Based on the above, one approach to how one or more of the above-described embodiments may be implemented into a standard is that: (1) the functionality of resetting the accumulative TPC f(i,1) when reconfiguring P_0 and alpha should be (i) active only when only one power control loop is defined for grant based PUSCH, or (ii) possible to activate or deactivate by higher layer configuration, or (iii) explicitly indicated by higher layer when reconfiguring P_0; (2) support explicit reset of the closed loop power control part in case of accumulated mode; and (3) when the UE is configured with multiple closed loops (f_c(i,1)), 1=1,2, the TPC commands present in group-based DCI (e.g., similar to LTE 3/3A) should be either explicitly and/or implicitly associated with one of the closed loops.

Note, however, that the above-described approach is just one example of how one or more of the above-described embodiments may be implemented into a standard. The present disclosure is not limited to the above-described approach. Indeed, modifications, additions, or omissions may be made to the example approach described above without departing from the scope of the present disclosure.

Figure 5:
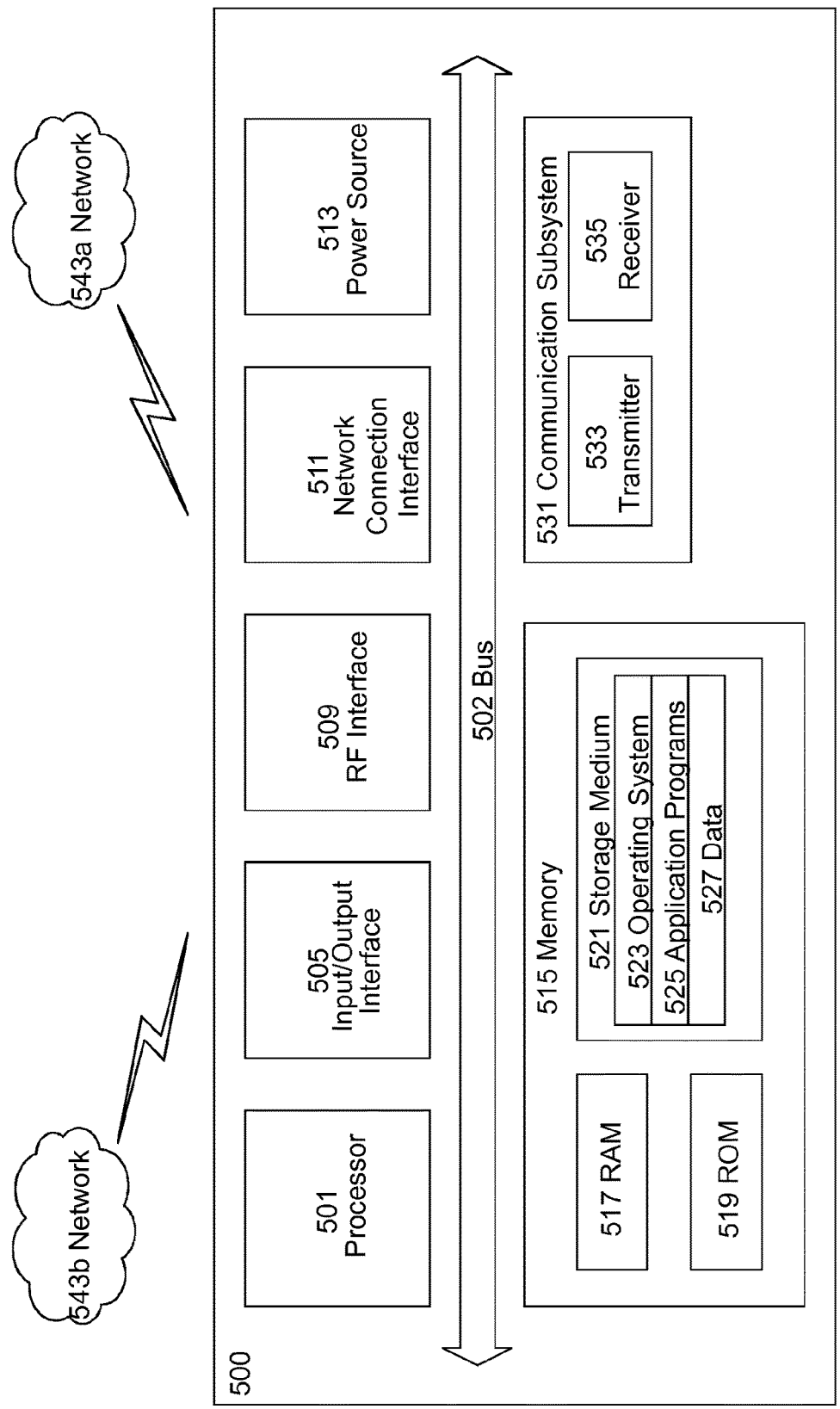
FIG. 5 illustrates one embodiment of a UE, in accordance with certain embodiments.

FIG. 5 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the $3^{rd}$ Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 513, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
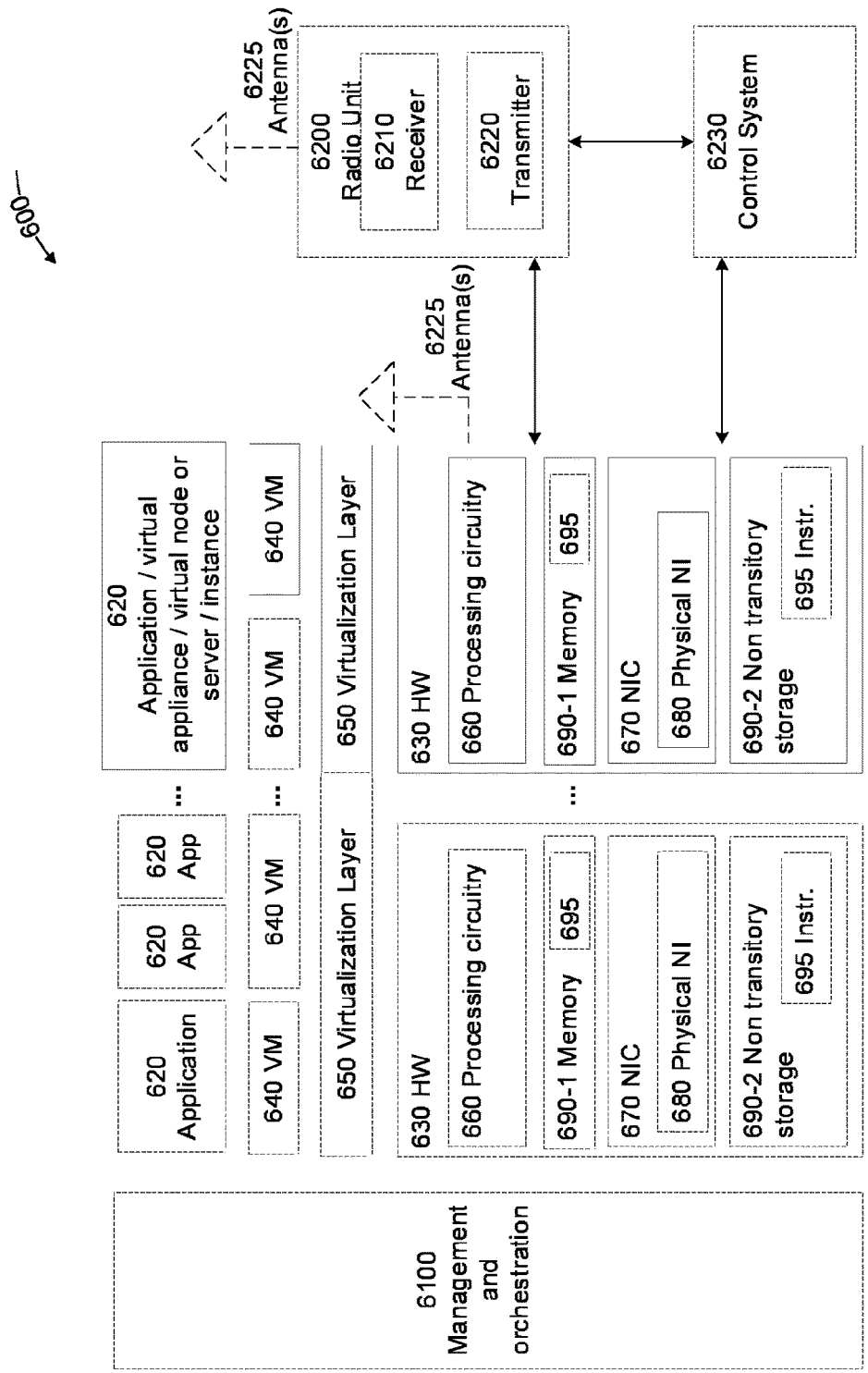
FIG. 6 is a schematic block diagram illustrating a virtualization environment, in accordance with certain embodiments.

FIG. 6 is a schematic block diagram illustrating a virtualization environment, in accordance with certain embodiments. More particularly, FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
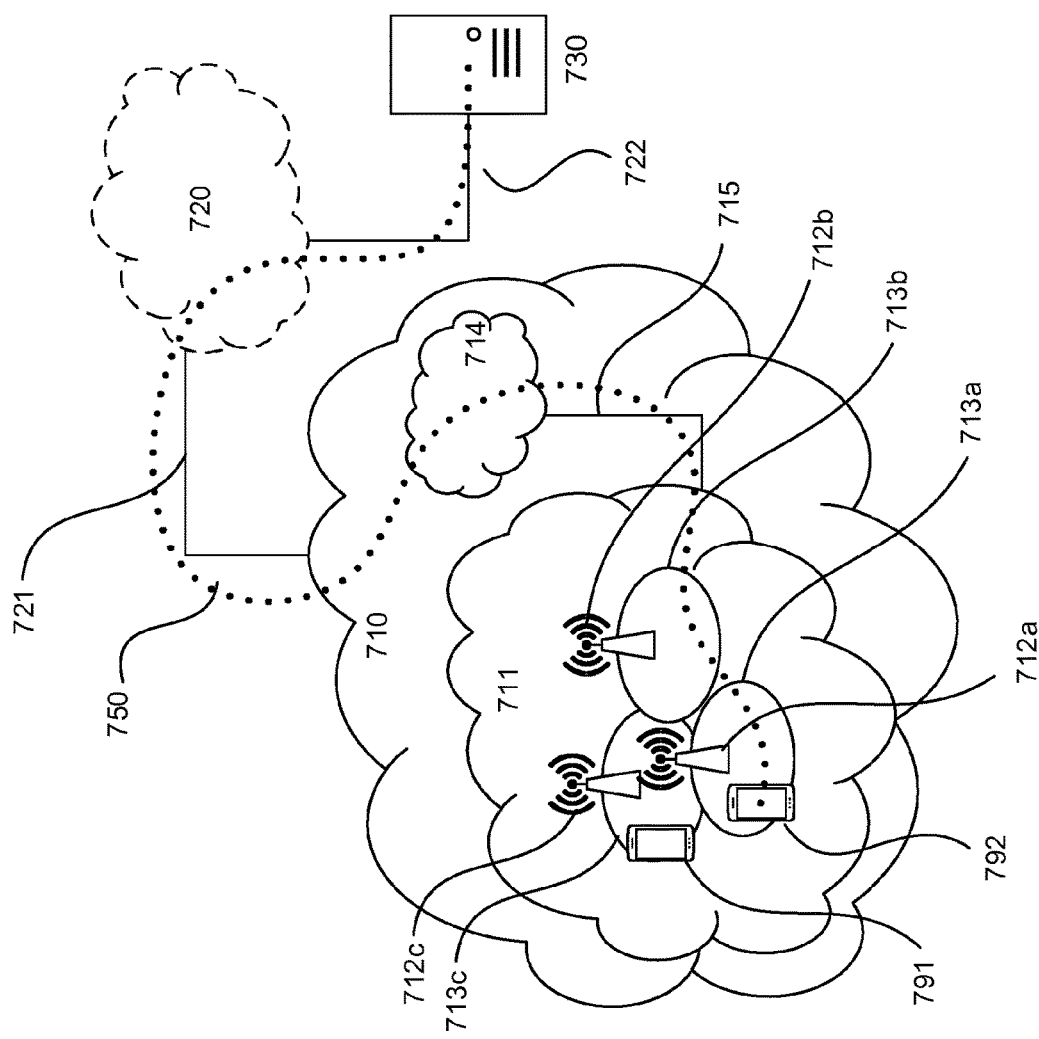
FIG. 7 illustrates an example telecommunication network connected via an intermediate network to a host computer, in accordance with certain embodiments.

FIG. 7 illustrates an example telecommunication network connected via an intermediate network to a host computer, in accordance with certain embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
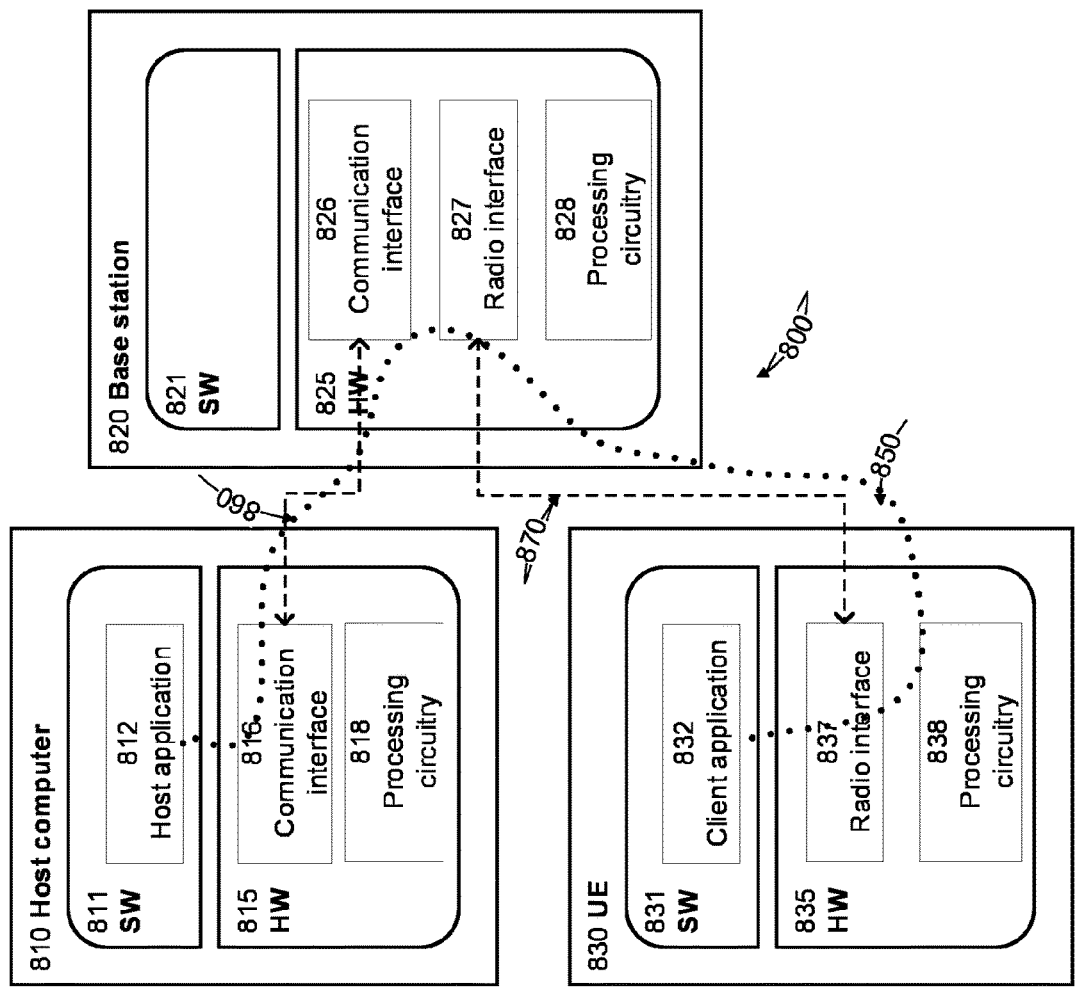
FIG. 8 illustrates an example of a host computer communicating via a base station with a UE over a partially wireless connection, in accordance with certain embodiments.

FIG. 8 illustrates an example of a host computer communicating via a base station with a UE over a partially wireless connection, in accordance with certain embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one programmable processors, application-specific integrated circuits, field or more programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the ability of UE 830 to unambiguously identify whether it is maximum/minimum power limited or not and thereby provide benefits such as improved power control at UE 830.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
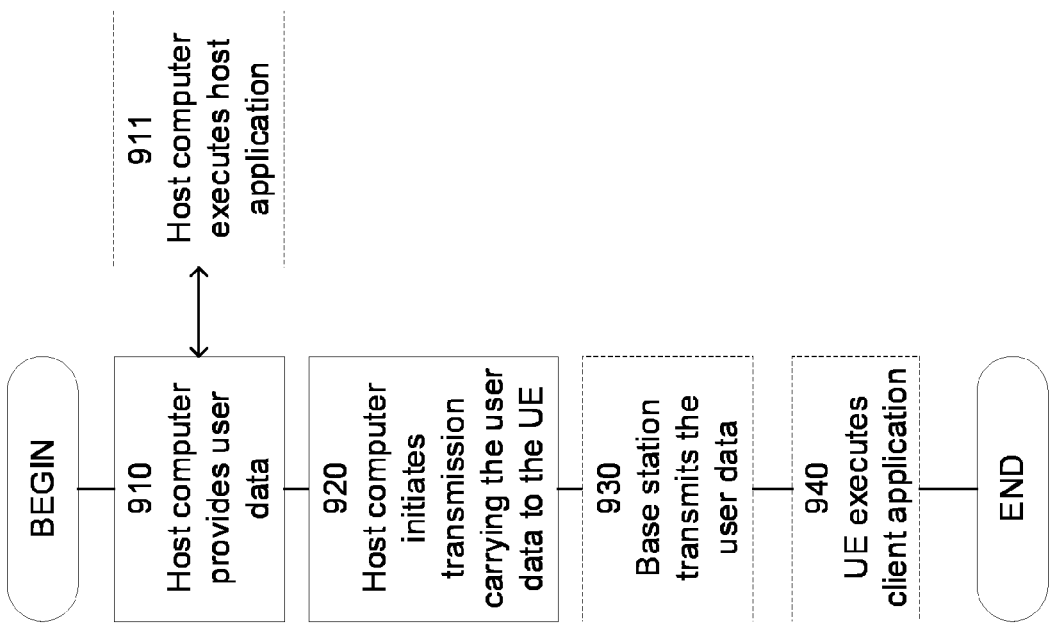
FIG. 9 is a flowchart of a method implemented in a communication system, in accordance with certain embodiments.

FIG. 9 is a flowchart of a method implemented in a communication system, in accordance with certain embodiments. In the example of FIG. 9, the communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
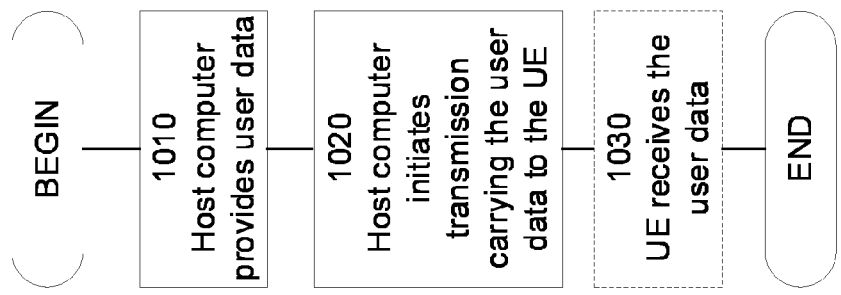
FIG. 10 is a flowchart of a method implemented in a communication system, in accordance with certain embodiments.

FIG. 10 is a flowchart of a method implemented in a communication system, in accordance with certain embodiments. In the example of FIG. 10, the communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figures 11, 12:
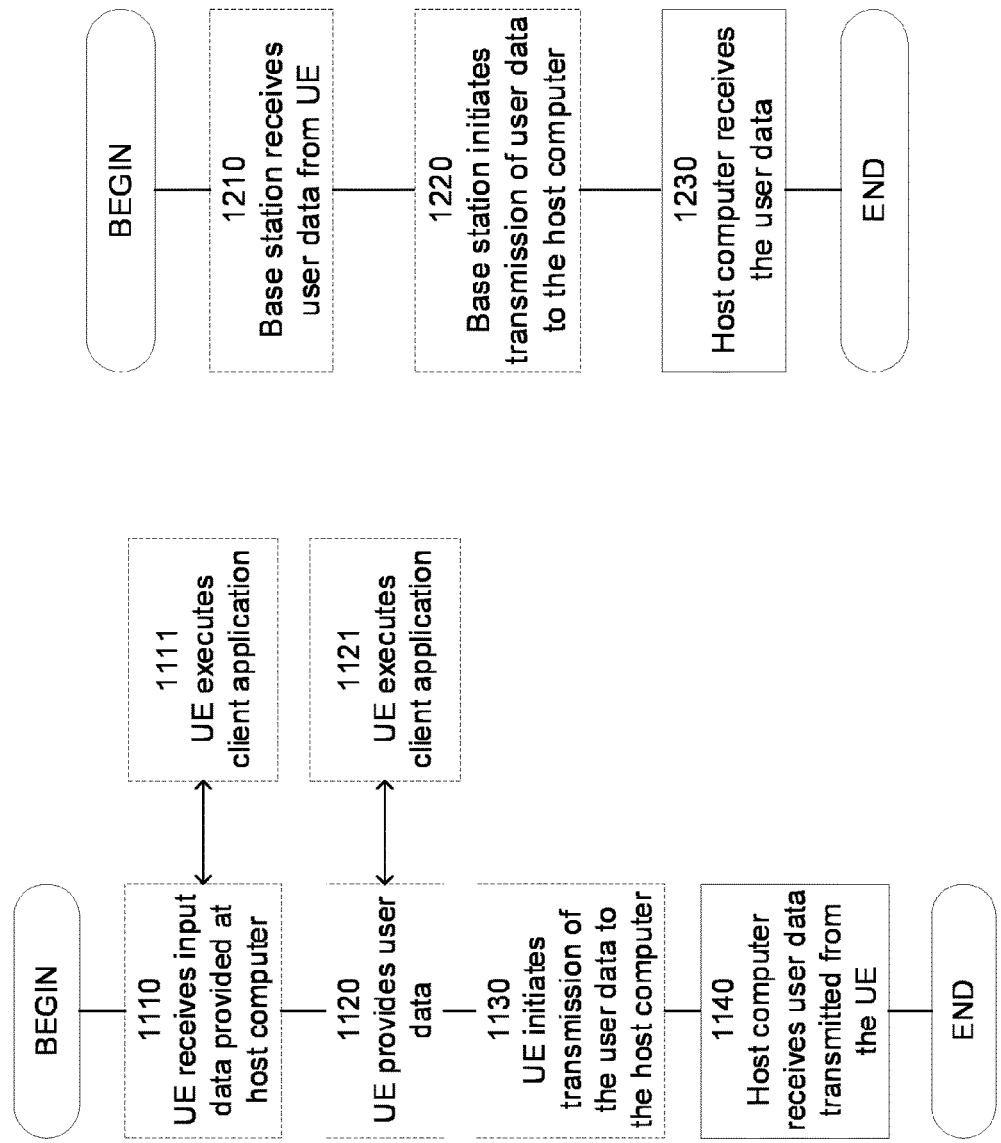
FIG. 11 is a flowchart of a method implemented in a communication system, in accordance with certain embodiments.
FIG. 12 is a flowchart of a method implemented in a communication system, in accordance with certain embodiments.

FIG. 11 is a flowchart of a method implemented in a communication system, in accordance with certain embodiments. In the example of FIG. 11, the communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12 is a flowchart of a method implemented in a communication system, in accordance with certain embodiments. In the example of FIG. 12, the communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 13:
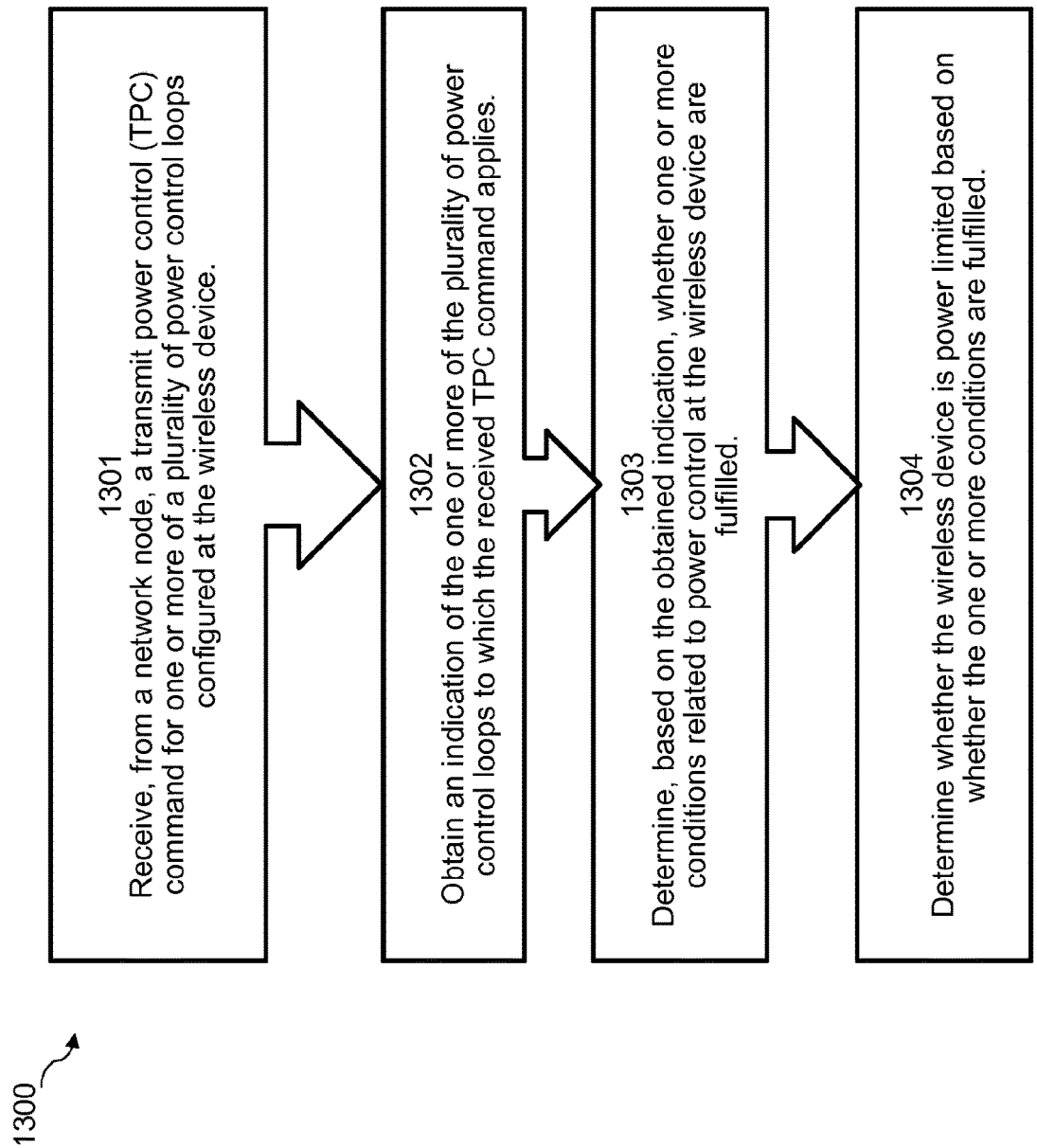
FIG. 13 is a flowchart of a method in a wireless device, in accordance with certain embodiments.

FIG. 13 is a flowchart of a method 1300 in a wireless device, in accordance with certain embodiments. Method 1300 begins at step 1301 where the wireless device receives, from a network node, a TPC command for one or more of a plurality of power control loops configured at the wireless device. In certain embodiments, the plurality of power control loops may comprise one or more of: one or more PUCCH power control loops; one or more SRS power control loops; and one or more PUSCH power control loops.

At step 1302, the wireless device obtains an indication of the one or more of the plurality of power control loops to which the received TPC command applies.

At step 1303, the wireless device determines, based on the obtained indication, whether one or more conditions related to power control at the wireless device are fulfilled. In certain embodiments, the indication may comprise at least one parameter associated with the one or more of the plurality of power control loops configured at the wireless device.

At step 1304, the wireless device determines whether the wireless device is power limited based on whether the one or more conditions are fulfilled. In certain embodiments, power limited may comprise one or more of: maximum power limited; and minimum power limited.

In certain embodiments, the method may comprise, in response to determining that the wireless device is not power limited, accumulating the received TPC command.

In certain embodiments, the method may comprise, in response to determining that the wireless device is power limited, determining whether to accumulate the received TPC command. In certain embodiments, determining whether the wireless device is power limited may result in a determination that the wireless device is maximum power limited, and determining whether to accumulate the received TPC command may comprise determining whether the received TPC command is positive or negative, and performing one of: in response to determining that the received TPC command is positive, refraining from accumulating the received TPC command; and in response to determining that the received TPC command is negative, accumulating the received TPC command. In certain embodiments, determining whether the wireless device is power limited may result in a determination that the wireless device is minimum power limited, and determining whether to accumulate the received TPC command may comprise determining whether the received TPC command is positive or negative, and performing one of: in response to determining that the received TPC command is negative, refraining from accumulating the received TPC command; and in response to determining that the received TPC command is positive, accumulating the received TPC command.

In certain embodiments, the wireless device may be configured with two power control loops, each of the configured power control loops associated with a different closed loop. Obtaining the indication may comprise receiving a power control loop index (e.g., k) indicating that the received TPC command applies to a first power control loop of the configured two power control loops. In such a scenario, the determination of whether the one or more conditions are fulfilled may be based on one or more parameters related to the first power control loop. In certain embodiments, the received TPC command may be received via an UL grant. In certain embodiments, the received TPC command may be received via one of DCI formats 0, 1, 2, and 4 (or via an analogous format of a different RAT, such as NR). In certain embodiments, the power control loop index may be received via an UL grant. In certain embodiments, the power control loop index may be received implicitly. In certain embodiments, the power control loop index may be received explicitly.

In certain embodiments, the wireless device may be configured with at least three power control loops, each power control loop associated with one of two closed loops, such that at least two of the three configured power control loops are associated with the same closed loop (e.g., a first closed loop of the two closed loops). Obtaining the indication may comprise receiving a closed loop index (e.g., 1) indicating that the received TPC command applies to all configured power control loops that are associated with the first closed loop of the two closed loops. In such a scenario, the determination of whether the one or more conditions are fulfilled may be based on one or more parameters related to at least one of the configured power control loops associated with the first closed loop. In certain embodiments, the received TPC command may be received as part of one or more TPC commands sent to a group of wireless devices (e.g., UEs). In certain embodiments, the received TPC command may be received via one of DCI formats 3 and 3A (or via an analogous format of a different RAT, such as NR). In certain embodiments, the received TPC command may be received in a PDCCH DCI without an associated UL grant. In certain embodiments, the one or more conditions may be a function of the closed loop index. In certain embodiments, the one or more conditions may comprise a function depending on more than one power control loop.

In certain embodiments, the one or more conditions may comprise a condition that all power control loops associated with the received closed loop index must be considered power limited in order to determine that the wireless device is power limited. In certain embodiments, the one or more conditions may comprise a condition that at least one power control loop associated with the received closed loop index must be considered power limited in order to determine that the wireless device is power limited. In certain embodiments, the one or more conditions may comprise a condition that all power control loops must be considered power limited in order to determine that the wireless device is power limited. In certain embodiments, the one or more conditions may comprise a condition that at least one power control loop must be considered power limited in order to determine that the wireless device is power limited.

In certain embodiments, the method may comprise determining whether a power control loop of the plurality of power control loops is classified as power limited. In certain embodiments, determining whether the power control loop of the plurality of power control loops is classified as power limited may be based on a non-virtual output power. In certain embodiments, determining whether the power control loop of the plurality of power control loops is classified as power limited may be based on a virtual output power. In certain embodiments, determining whether the power control loop of the plurality of power control loops is classified as power limited may be based on a PUCCH transmission power. In certain embodiments, determining whether the power control loop of the plurality of power control loops is classified as power limited may not be based on a PUCCH transmission power.

In certain embodiments, the method may comprise providing user data and forwarding the user data to a host computer via the transmission to the base station.

Figure 14:
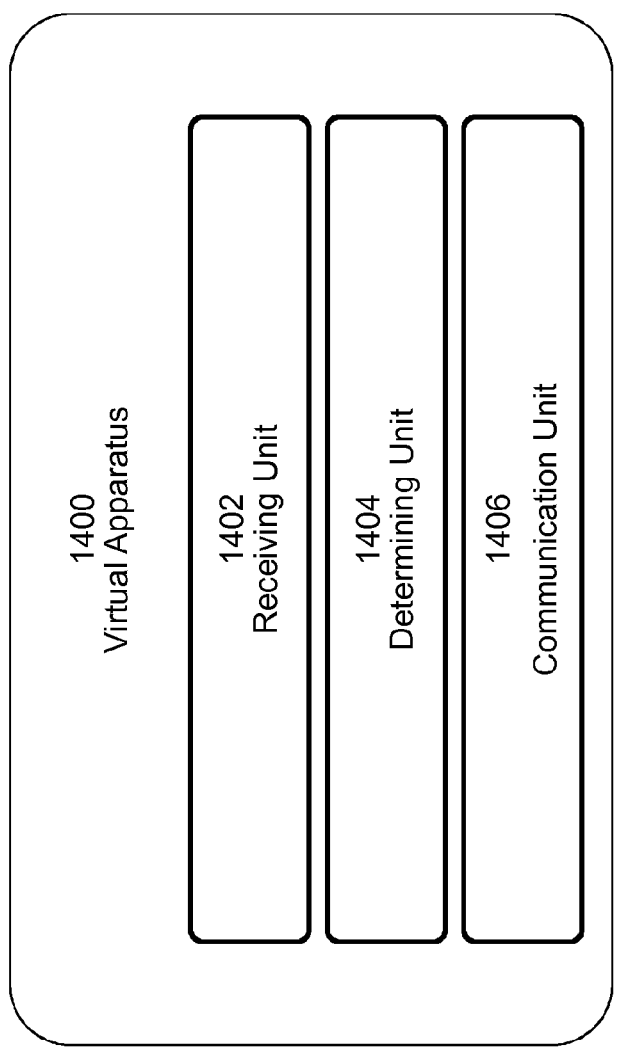
FIG. 14 is a schematic block diagram of a virtualization apparatus, in accordance with certain embodiments.

FIG. 14 is a schematic block diagram of a virtualization apparatus, in accordance with certain embodiments. More particularly, FIG. 14 illustrates a schematic block diagram of an apparatus 1400 in a wireless network (for example, the wireless network shown in FIG. 1). Apparatus 1400 may be implemented in a wireless device (e.g., wireless device 110 shown in FIG. 1). Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1402, determining unit 1404, communication unit 1406, and any other suitable units of apparatus 1400 to perform corresponding functions according one or more embodiments of the present disclosure, such as the methods for determining whether a wireless device is power limited described above.

In certain embodiments, apparatus 1400 may be a UE. As illustrated in FIG. 14, apparatus 1400 includes receiving unit 1402, determining unit 1404, and communication unit 1406. Receiving unit 1402 may be configured to perform the receiving functions of apparatus 1400. For example, receiving unit 1402 may be configured to receive, from a network node, a TPC command for one or more of a plurality of power control loops configured at apparatus 1400. In certain embodiments, receiving unit 1402 may be configured to receive the TPC command via an UL grant. In certain embodiments, receiving unit 1402 may be configured to receive the TPC command via one of DCI formats 0, 1, 2, and 4 (or via an analogous format of a different RAT, such as NR). In certain embodiments, receiving unit 1402 may be configured to receive the TPC command as part of one or more TPC commands sent to a group of wireless devices. In certain embodiments, receiving unit 1402 may be configured to receive the TPC command via one of DCI formats 3 and 3A (or via an analogous format of a different RAT, such as NR). In certain embodiments, receiving unit 1402 may be configured to receive the TPC command in a PDCCH DCI without an associated UL grant.

As another example, receiving unit 1402 may be configured to obtain an indication of the one or more of the plurality of power control loops to which the received TPC command applies. In certain embodiments, receiving unit 1402 may be configured to receive one or more parameters associated with the one or more of the plurality of power control loops configured at apparatus 1400. In certain embodiments, receiving unit 1402 may be configured to receive a power control loop index (e.g., k) indicating that the received TPC command applies to a first power control loop of the configured two power control loops. In certain embodiments, receiving unit 1402 may be configured to receive the power control loop index via an UL grant. In certain embodiments, receiving unit 1402 may be configured to receive the power control loop index implicitly. In certain embodiments, receiving unit 1402 may be configured to receive the power control loop index explicitly. In certain embodiments, receiving unit 1402 may be configured to receive a closed loop index (e.g., 1) indicating that the received TPC command applies to all configured power control loops that are associated with the same closed loop (e.g., a first closed loop of two closed loops).

Receiving unit 1402 may receive any suitable information (e.g., from a wireless device or another network node). Receiving unit 1402 may include a receiver and/or a transceiver, such as RF transceiver circuitry 122 described above in relation to FIG. 1. Receiving unit 1402 may include circuitry configured to receive messages and/or signals (wireless or wired). In particular embodiments, receiving unit 1402 may communicate received messages and/or signals to determining unit 1404 and/or any other suitable unit of apparatus 1400. The functions of receiving unit 1402 may, in certain embodiments, be performed in one or more distinct units.

Determining unit 1404 may be configured to perform the processing functions of apparatus 1400. For example, determining unit 1404 may be configured to obtain an indication of the one or more of the plurality of power control loops to which the received TPC command applies. In certain embodiments, determining unit 1404 may be configured to obtain at least one parameter associated with the one or more of the plurality of power control loops configured at apparatus 1400. In certain embodiments, determining unit 1404 may be configured to obtain a power control loop index (e.g., k) indicating that the received TPC command applies to a first power control loop of the configured two power control loops. In certain embodiments, determining unit 1404 may be configured to obtain the power control loop index implicitly. In certain embodiments, determining unit 1404 may be configured to obtain the power control loop index explicitly. In certain embodiments, determining unit 1404 may be configured to obtain a closed loop index (e.g., 1) indicating that the received TPC command applies to all configured power control loops that are associated with the same closed loop (e.g., a first closed loop of two closed loops).

As another example, determining unit 1404 may be configured to determine, based on the obtained indication, whether one or more conditions related to power control at apparatus 1400 are fulfilled. In certain embodiments, determining unit 1404 may be configured to determine whether the one or more conditions are fulfilled based on one or more parameters related to a first power control loop. In certain embodiments, determining unit 1404 may be configured to determine whether the one or more conditions are fulfilled based on one or more parameters related to at least one of the configured power control loops associated with a first closed loop.

As still another example, determining unit 1404 may be configured to determine whether apparatus 1400 is power limited based on whether the one or more conditions are fulfilled. As yet another example, determining unit 1404 may be configured to, in response to determining that apparatus 1400 is not power limited, accumulate the received TPC command.

As another example, determining unit 1404 may be configured to, in response to determining that apparatus 1400 is power limited, determine whether to accumulate the received TPC command. In certain embodiments, determining whether apparatus 1400 is power limited may result in a determination that apparatus 1400 is maximum power limited. In such a scenario, determining unit 1404 may be configured to determine whether to accumulate the received TPC command by determining whether the received TPC command is positive or negative, and performing one of: in response to determining that the received TPC command is positive, refraining from accumulating the received TPC command; and in response to determining that the received TPC command is negative, accumulating the received TPC command. In certain embodiments, determining whether apparatus 1400 is power limited may result in a determination that apparatus 1400 is minimum power limited. In such a scenario, determining unit 1404 may be configured to determine whether to accumulate the received TPC command by determining whether the received TPC command is positive or negative, and performing one of: in response to determining that the received TPC command is negative, refraining from accumulating the received TPC command; and in response to determining that the received TPC command is positive, accumulating the received TPC command.

As another example, determining unit 1404 may be configured to determine whether a power control loop of the plurality of power control loops is classified as power limited. In certain embodiments, determining unit 1404 may be configured to determine whether the power control loop of the plurality of power control loops is classified as power limited based on a non-virtual output power. In certain embodiments, determining unit 1404 may be configured to determine whether the power control loop of the plurality of power control loops is classified as power limited based on a virtual output power. In certain embodiments, determining unit 1404 may be configured to determine whether the power control loop of the plurality of power control loops is classified as power limited based on a PUCCH transmission power. In certain embodiments, determining unit 1404 may be configured to determine whether the power control loop of the plurality of power control loops is classified as power limited not based on a PUCCH transmission power.

Determining unit 1404 may include or be included in one or more processors, such as processing circuitry 120 described above in relation to FIG. 1. Determining unit 1404 may include analog and/or digital circuitry configured to perform any of the functions of determining unit 1404 and/or processing circuitry 120 described above. The functions of determining unit 1404 may, in certain embodiments, be performed in one or more distinct units.

Communication unit 1406 may be configured to perform the transmission functions of apparatus 1400. For example, communication unit 1406 may be configured to forward user data to a host computer via a transmission to a network node (e.g., base station).

Communication unit 1406 may include a transmitter and/or a transceiver, such as RF transceiver circuitry 122 described above in relation to FIG. 1. Communication unit 1406 may include circuitry configured to transmit messages and/or signals (e.g., through wireless or wired means). In particular embodiments, communication unit 1406 may receive messages and/or signals for transmission from determining unit 1404 or any other unit of apparatus 1400. The functions of communication unit 1404 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Certain example embodiments contemplated by the present disclosure are described below. Note that the enumerated embodiments below are for purposes of example only, and the present disclosure is not limited to the example embodiments enumerated below.

Group A Embodiments

1. A method performed by a wireless device for determining whether the wireless device is power limited, the method comprising:
   receiving, from a network node, a transmit power control (TPC) command for at least one of a plurality of power control loops configured at the wireless device;
   obtaining one or more parameters associated with one or more of the plurality of power control loops configured at the wireless device;
   determining, based on the one or more parameters, whether one or more conditions are fulfilled, the one or more conditions related to power control at the wireless device; and
   determining whether the wireless device is power limited based on whether the one or more conditions are fulfilled.

2. The method of embodiment 1, further comprising:
   in response to determining that the wireless device is not power limited, accumulating the received TPC command.

3. The method of any of embodiments 1 or 2, further comprising:
   in response to determining that the wireless device is power limited, determining whether to accumulate the received TPC command.

4. The method of embodiment 3, wherein:
   the wireless device is determined to be maximum power limited; and
   determining whether to accumulate the received TPC command comprises:
   i. determining whether the received TPC command is positive or negative; and
   ii. performing one of:
      1. upon determining that the received TPC command is positive, refraining from accumulating the received TPC command; and
      2. upon determining that the received TPC command is negative, accumulating the received TPC command.

5. The method of any of embodiments 3-4, wherein:
   the wireless device is determined to be minimum power limited; and
   determining whether to accumulate the received TPC command comprises:
   i. determining whether the received TPC command is positive or negative; and
   ii. performing one of:
      1. upon determining that the received TPC command is negative, refraining from accumulating the received TPC command; and
      2. upon determining that the received TPC command is positive, accumulating the received TPC command.

6. The method of any of embodiments 1-5, wherein:
   the wireless device is configured with two power control loops, each of the configured power control loops associated with a different closed loop;

the method further comprises receiving an indication (k) indicating that the received TPC command applies to a first power control loop of the configured two power control loops; and wherein the determination of whether the one or more conditions are fulfilled is based on one or more parameters related to the first power control loop.

7. The method of embodiment 6, wherein the received TPC command is received via an uplink grant.

8. The method of any of embodiments 6-7, wherein the received TPC command is received via one of DCI formats 0, 1, 2, and 4.

9. The method of any of embodiments 6-8, wherein k is received either:
implicitly; or
explicitly.

10. The method of any of embodiments 1-9, wherein:
the wireless device is configured with at least three power control loops, each power control loop associated with one of two possible closed loops, such that at least two of the three configured power control loops are associated with the same closed loop;
the method further comprises receiving a closed loop index (l) indicating that the received TPC command applies to all configured power control loops that are associated with a first closed loop, wherein the first closed loop is one of the two possible closed loops; and
wherein the determination of whether the one or more conditions are fulfilled is based on one or more parameters related to at least one of the configured power control loops that are associated with the first closed loop.

11. The method of embodiment 10, wherein the received TPC command is received as part of one or more TPC commands sent to a group of wireless devices.

12. The method of any of embodiments 10-11, wherein the received TPC command is received via one of DCI formats 3 and 3A.

13. The method of any of embodiments 10-12, wherein the one or more conditions are a function of the closed loop index (l).

14. The method of any of embodiments 10-13, wherein the one or more conditions comprise a function depending on more than one power control loop.

15. The method of any of embodiments 10-14, wherein the one or more conditions comprise a condition that all power control loops associated with the received closed loop index (l) must be considered power limited in order to determine that the wireless device is power limited.

16. The method of any of embodiments 10-14, wherein the one or more conditions comprise a condition that at least one power control loop associated with the received closed loop index (l) must be considered power limited in order to determine that the wireless device is power limited.

17. The method of any of embodiments 10-14, wherein the one or more conditions comprise a condition that all power control loops must be considered power limited in order to determine that the wireless device is power limited.

18. The method of any of embodiments 10-14, wherein the one or more conditions comprise a condition that at least one power control loop must be considered power limited in order to determine that the wireless device is power limited.

19. The method of any of embodiments 1-18, further comprising:
determining whether a power control loop of the plurality of power control loops is classified as power limited.

20. The method of embodiment 19, wherein determining whether the power control loop of the plurality of power control loops is classified as power limited is based on a non-virtual output power.

21. The method of embodiment 19, wherein determining whether the power control loop of the plurality of power control loops is classified as power limited is based on a virtual output power.

22. The method of any of embodiments 19-21, wherein determining whether the power control loop of the plurality of power control loops is classified as power limited is based on a PUCCH transmission power.

23. The method of any of embodiments 19-21, wherein determining whether the power control loop of the plurality of power control loops is classified as power limited is not based on a PUCCH transmission power.

24. The method of any of embodiments 1-23, wherein the plurality of power control loops comprises one or more of:
one or more PUCCH power control loops;
one or more SRS power control loops; and
one or more PUSCH power control loops.

25. The method of any of embodiments 1-24, wherein power limited comprises one or more of:
maximum power limited; and
minimum power limited.

26. The method of any of embodiments 1-25, further comprising:
providing user data; and
forwarding the user data to a host computer via the transmission to the network node.

Group B Embodiments

27. A wireless device for determining whether the wireless device is power limited, the wireless device comprising:
processing circuitry configured to perform any of the steps of any of the Group A embodiments; and
power supply circuitry configured to supply power to the wireless device.

28. A wireless device (UE) for determining whether the wireless device is power limited, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

29. A communication system including a host computer comprising:
processing circuitry configured to provide user data; and
a communication interface configured to forward the user data to a cellular network for transmission to a wireless device (UE),
wherein the cellular network comprises a network node having a radio interface and processing circuitry, the network node's processing circuitry configured to perform any of the steps described above.

30. The communication system of embodiment 29 further including the network node.

31. The communication system of any of embodiments 29-30, further including the UE, wherein the UE is configured to communicate with the network node.

32. The communication system of any of embodiments 29-31, wherein:
the processing circuitry of the host computer is configured to execute a host application, thereby providing the user data; and
the UE comprises processing circuitry configured to execute a client application associated with the host application.

33. A method implemented in a communication system including a host computer, a network node and a wireless device (UE), the method comprising:
at the host computer, providing user data; and
at the host computer, initiating a transmission carrying the user data to the UE via a cellular network comprising the network node, wherein the network node performs any of the steps of any of the steps described above.

34. The method of embodiment 33, further comprising, at the network node, transmitting the user data.

35. The method of any of embodiments 33-34, wherein the user data is provided at the host computer by executing a host application, the method further comprising, at the UE, executing a client application associated with the host application.

36. A wireless device (UE) configured to communicate with a network node, the UE comprising a radio interface and processing circuitry configured to perform any of embodiments 1-35.

37. A communication system including a host computer comprising:
processing circuitry configured to provide user data; and
a communication interface configured to forward user data to a cellular network for transmission to a wireless device (UE),
wherein the UE comprises a radio interface and processing circuitry, the UE's components configured to perform any of the steps of any of the Group A embodiments.

38. The communication system of embodiment 37, wherein the cellular network further includes a network node configured to communicate with the UE.

39. The communication system of any of embodiments 37-38, wherein:
the processing circuitry of the host computer is configured to execute a host application, thereby providing the user data; and
the UE's processing circuitry is configured to execute a client application associated with the host application.

40. A method implemented in a communication system including a host computer, a network node and a wireless device (UE), the method comprising:
at the host computer, providing user data; and
at the host computer, initiating a transmission carrying the user data to the UE via a cellular network comprising the network node, wherein the UE performs any of the steps of any of the Group A embodiments.

41. The method of embodiment 40, further comprising at the UE, receiving the user data from the network node.

42. A communication system including a host computer comprising:
communication interface configured to receive user data originating from a transmission from a wireless device (UE) to a network node,
wherein the UE comprises a radio interface and processing circuitry, the UE's processing circuitry configured to perform any of the steps of any of the Group A embodiments.

43. The communication system of embodiment 42, further including the UE.

44. The communication system of any of embodiments 42-43, further including the network node, wherein the network node comprises a radio interface configured to communicate with the UE and a communication interface configured to forward to the host computer the user data carried by a transmission from the UE to the network node.

45. The communication system of ay of embodiments 42-44, wherein:
the processing circuitry of the host computer is configured to execute a host application; and
the UE's processing circuitry is configured to execute a client application associated with the host application, thereby providing the user data.

46. The communication system of any of embodiments 42-45, wherein:
the processing circuitry of the host computer is configured to execute a host application, thereby providing request data; and
the UE's processing circuitry is configured to execute a client application associated with the host application, thereby providing the user data in response to the request data.

47. A method implemented in a communication system including a host computer, a network node and a wireless device (UE), the method comprising:
at the host computer, receiving user data transmitted to the network node from the UE, wherein the UE performs any of the steps of any of the Group A embodiments.

48. The method of embodiment 47, further comprising, at the UE, providing the user data to the network node.

49. The method of any of embodiments 47-48, further comprising:
at the UE, executing a client application, thereby providing the user data to be transmitted; and
at the host computer, executing a host application associated with the client application.

50. The method of any of embodiments 47-49, further comprising:
at the UE, executing a client application; and
at the UE, receiving input data to the client application, the input data being provided at the host computer by executing a host application associated with the client application,
wherein the user data to be transmitted is provided by the client application in response to the input data.

51. A communication system including a host computer comprising a communication interface configured to receive user data originating from a transmission from a wireless device (UE) to a network node, wherein the network node comprises a radio interface and processing circuitry, the network node's processing circuitry configured to perform any of the steps of any of embodiments 1-50.

52. The communication system of embodiment 51, further including the network node.

53. The communication system of any of embodiments 51-52, further including the UE, wherein the UE is configured to communicate with the network node.

54. The communication system of any of embodiments 51-53, wherein:
the processing circuitry of the host computer is configured to execute a host application;
the UE is configured to execute a client application associated with the host application, thereby providing the user data to be received by the host computer.

55. A method implemented in a communication system including a host computer, a network node and a wireless device (UE), the method comprising:
at the host computer, receiving, from the network node, user data originating from a transmission which the network node has received from the UE, wherein the UE performs any of the steps of any of the Group A embodiments.

56. The method of embodiment 55, further comprising at the network node, receiving the user data from the UE.

57. The method of any of embodiments 55-56, further comprising at the network node, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
CRC Cyclic Redundancy Check
C-RNTI Cell RNTI
CSI Channel State Information
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
PC Power Control
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SRS Sounding Reference Signal
SS Synchronization Signal
SSS Secondary Synchronization Signal
TDD Time Division Duplex
TDOA Time Difference of Arrival
TOA Time of Arrival
TPC Transmit Power Control
TRP Transmission Reception Point
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for determining whether the wireless device is power limited, the method comprising:
receiving, from a network node, a transmit power control (TPC) command for one or more of a plurality of power control loops configured at the wireless device, wherein each power control loop of the plurality of power control loops is associated with one of two control loops;
obtaining an indication of the one or more of the plurality of power control loops to which the received TPC command applies;
determining, based on the obtained indication, whether one or more conditions related to power control at the wireless device are fulfilled, wherein the one or more conditions indicate which of the power control loops that must be considered power limited in order to determine that the wireless device is power limited and is based at least in part on the one control loop associated with each of the power control loops; and
determining whether the wireless device is power limited based on whether the one or more conditions are fulfilled.

2. A wireless device for determining whether the wireless device is power limited, the wireless device comprising:
a receiver;
a transmitter; and
processing circuitry coupled to the receiver and the transmitter, the processing circuitry configured to:
receive, from a network node, a transmit power control (TPC) command for one or more of a plurality of power control loops configured at the wireless device, wherein each power control loop of the plurality of power control loops is associated with one of two control loops;
obtain an indication of the one or more of the plurality of power control loops to which the received TPC command applies;
determine, based on the obtained indication, whether one or more conditions related to power control at the wireless device are fulfilled, wherein the one or more conditions indicate which of the power control loops that must be considered power limited in order to determine that the wireless device is power limited and is based at least in part on the one control loop associated with each of the power control loops; and
determine whether the wireless device is power limited based on whether the one or more conditions are fulfilled.

3. The wireless device of claim 2, wherein the indication comprises at least one parameter associated with the one or more of the plurality of power control loops configured at the wireless device.

4. The wireless device of claim 2, wherein the processing circuitry is further configured to:
accumulate the received TPC command in response to a determination that the wireless device is not power limited.

5. The wireless device of claim 2, wherein the processing circuitry is further configured to:
determine whether to accumulate the received TPC command in response to a determination that the wireless device is power limited.

6. The wireless device of claim 2, wherein:
the wireless device is configured with two power control loops, each of the configured power control loops associated with a different closed loop;

the processing circuitry configured to obtain the indication is further configured to obtain a power control loop index indicating that the received TPC command applies to a first power control loop of the configured two power control loops; and the processing circuitry is further configured to determine whether the one or more conditions are fulfilled based on one or more parameters related to the first power control loop.

7. The wireless device of claim 2, wherein the processing circuitry is configured to receive the TPC command via an uplink grant.

8. The wireless device of claim 2, wherein the processing circuitry is configured to receive the power control loop index via an uplink grant.

9. The wireless device of claim 2, wherein:

the wireless device is configured with at least three power control loops, each power control loop associated with one of two closed loops, such that at least two of the three configured power control loops are associated with a first closed loop of the two closed loops;

the processing circuitry configured to obtain the indication is further configured to obtain a closed loop index indicating that the received TPC command applies to all configured power control loops that are associated with the first closed loop of the two closed loops; and the processing circuitry is further configured to determine whether the one or more conditions are fulfilled based on one or more parameters related to at least one of the configured power control loops associated with the first closed loop.

10. The wireless device of claim 9, wherein the processing circuitry is configured to receive the TPC command as part of one or more TPC commands sent to a group of wireless devices.

11. The wireless device of claim 9, wherein the processing circuitry is configured to receive the TPC command in a Physical Downlink Control Channel (PDCCH) downlink control information (DCI) without an associated uplink grant.

12. The wireless device of claim 9, wherein the one or more conditions comprise a condition that at least one power control loop associated with the received closed loop index must be considered power limited in order to determine that the wireless device is power limited.

13. The wireless device of claim 9, wherein the one or more conditions comprise a condition that all power control loops must be considered power limited in order to determine that the wireless device is power limited.

14. The wireless device of claim 9, wherein the one or more conditions comprise a condition that at least one power control loop must be considered power limited in order to determine that the wireless device is power limited.

15. The wireless device of claim 2, wherein the processing circuitry is further configured to:

determine whether a power control loop of the plurality of power control loops is classified as power limited.

16. The wireless device of claim 15, wherein the processing circuitry is further configured to determine whether the power control loop of the plurality of power control loops is classified as power limited based on a non-virtual output power.

17. The wireless device of claim 15, wherein the processing circuitry is further configured to determine whether the power control loop of the plurality of power control loops is classified as power limited based on a virtual output power.

18. The wireless device of claim 15, wherein the processing circuitry is further configured to determine whether the power control loop of the plurality of power control loops is classified as power limited based on a Physical Uplink Control Channel (PUCCH) transmission power.

19. The wireless device of claim 2, wherein the plurality of power control loops comprises one or more of:

one or more PUCCH power control loops;

one or more Sounding Reference Signal (SRS) power control loops; and one or more Physical Uplink Shared Channel (PUSCH) power control loops.

20. The wireless device of claim 2, wherein power limited comprises one or more of:

maximum power limited; and minimum power limited.

* * * * *

UNITED STATES PATENT AND TRADEMARK OFFICE
CERTIFICATE OF CORRECTION

| | | |
|---|---|---|
| PATENT NO. | : 12,156,139 B2 | Page 1 of 11 |
| APPLICATION NO. | : 17/316928 | |
| DATED | : November 26, 2024 | |
| INVENTOR(S) | : Wernersson et al. | |

It is certified that error appears in the above-identified patent and that said Letters Patent is hereby corrected as shown below:

On the Title Page

In Item (56), under "OTHER PUBLICATIONS", in Column 2, Line 1, delete "v1 .0.0;" and insert -- v1.0.0; --, therefor.

On Page 2, in Item (56), under "OTHER PUBLICATIONS", in Column 2, Line 5, delete "Iltay;" and insert -- Italy; --, therefor.

On Page 2, in Item (56), under "OTHER PUBLICATIONS", in Column 2, Line 8, delete "Tsg Ran WG1 Nr" and insert -- TSG RAN WG1 NR --, therefor.

On Page 2, in Item (56), under "OTHER PUBLICATIONS", in Column 2, Line 11, delete "Tsg Ran" and insert -- TSG RAN --, therefor.

On Page 2, in Item (56), under "OTHER PUBLICATIONS", in Column 2, Line 14, delete "Tsg Ran" and insert -- TSG RAN --, therefor.

On Page 2, in Item (56), under "OTHER PUBLICATIONS", in Column 2, Line 15, delete "Nr Ul" and insert -- NR UL --, therefor.

On Page 2, in Item (56), under "OTHER PUBLICATIONS", in Column 2, Line 17, delete "1 Patent" and insert -- Patent --, therefor.

Signed and Sealed this
Eighteenth Day of November, 2025

John A. Squires
*Director of the United States Patent and Trademark Office*

CERTIFICATE OF CORRECTION (continued)  Page 2 of 11
U.S. Pat. No. 12,156,139 B2

In the Drawings

In Fig. 9, Sheet 9 of 12, delete " 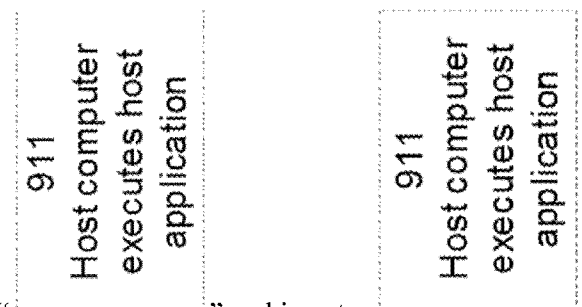 " and insert -- --, therefor.

In Fig. 9, Sheet 9 of 12, delete " 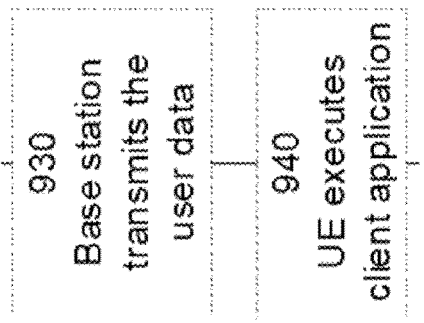 " and insert -- 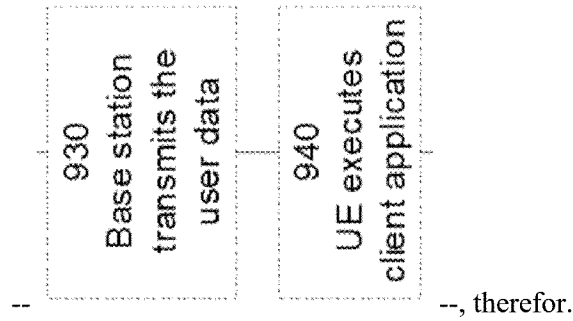 --, therefor.

In Fig. 10, Sheet 9 of 12, delete " 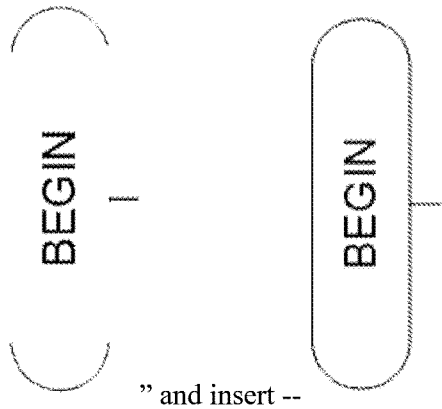 " and insert -- --, therefor.

CERTIFICATE OF CORRECTION (continued)
U.S. Pat. No. 12,156,139 B2

In the Specification

In Column 1, Line 9, delete "2020" and insert -- 2020, now U.S. Pat. No. 11,019,571 --, therefor.

In Column 1, Line 21, delete "morc" and insert -- more --, therefor.

In Column 1, Lines 57-58,
delete "$P_{PRACH}=\min\{P_{CMAXc}(i), PREAMBLE\_RECEIVED\_TARGET\_POWER+PL_c\}$." and insert
-- $P_{PRACH}=\min\{P_{CMAX,c}(i), PREAMBLE\_RECEIVED\_TARGET\_POWER+PL_c\}$. --,
therefor.

In Column 2, Lines 5-6, delete
"$P_{PUSCH,c}=\min\{P_{CMAX,c}-P_{PUCCH}, P_{0,PUSCH}+\alpha PL_c+10\log_{10}M+\nabla_{MCS}+f(i)\}$." and insert
-- $P_{PUSCH,c}=\min\{P_{CMAX,c}-P_{PUCCH}, P_{0,PUSCH}+\alpha PL_c+10\log_{10}M+\nabla_{MCS}+f(i)\}$. --, therefor.

In Column 2, Lines 11-12, delete
"$P_{SRS,c}(i)=\min\{P_{CMAX,c}(i), P_{SRS\_OFFSETSc}(m)+10\log_{10}(M_{SRS,c})+P_{C\_PUSCH}(j)+\alpha_c(j)\cdot PL_c(+f_c(i))\}$." and insert
-- $P_{SRS,c}(i)=\min\{P_{CMAX,c}(i), P_{SRS\_OFFSET,c}(m)+10\log_{10}(M_{SRS,c})+P_{C\_PUSCH,c}(j)+\alpha_c(j)\cdot PL_c(+f_c(i))\}$. --, therefor.

In Column 2, Line 26, delete "(e.g . . .)" and insert -- (e.g., --, therefor.

In Column 2, Line 43, delete "$f_c(i)=f_c(i-1)+\delta_{PUSCHc}(i-K_{PUSCH})$," and insert
-- $f_c(i)=f_c(i-1)+\delta_{PUSCH,c}(i-K_{PUSCH})$, --, therefor.

In Column 2, Line 44, delete "$\delta_{PUSCHc}$" and insert -- $\delta_{PUSCH,c}$ --, therefor.

In Column 2, Line 47, delete "v. 10.13.0" and insert -- v.10.13.0 --, therefor.

In Column 2, Line 49, delete "$P_{O\_UE\_PUSCHc}$" and insert -- $P_{O\_UE\_PUSCH,c}$ --, therefor.

In Column 2, Line 57, delete "$\delta_{PUSCHç}$" and insert -- $\delta_{PUSCH,c}$ --, therefor.

In Column 2, Line 59, delete "$\delta_{PUSCHç}$" and insert -- $\delta_{PUSCH,c}$ --, therefor.

In Column 2, Line 61, delete "$\delta_{PUSCHç}$" and insert -- $\delta_{PUSCH,c}$ --, therefor.

In Column 3, Line 3, delete "$\delta_{PUSCHç}$" and insert -- $\delta_{PUSCH,c}$ --, therefor.

In Column 3, Line 7, delete "$\delta_{PUSCHç}$" and insert -- $\delta_{PUSCH,c}$ --, therefor.

CERTIFICATE OF CORRECTION (continued)
U.S. Pat. No. 12,156,139 B2

In Column 3, Line 15, delete " $g(i) = g(i-1) + \sum_{m0}^{M1} \delta_{PUCCH}(i - k_m),$ " and insert
-- $g(i) = g(i-1) + \sum_{m=0}^{M-1} \delta_{PUCCH}(i - k_m),$ --, therefor.

In Column 3, Line 27, delete "$\delta_{PUSCH}$" and insert -- $\delta_{PUCCH}$ --, therefor.

In Column 3, Line 30, delete "$\delta_{PUSCH}$" and insert -- $\delta_{PUCCH}$ --, therefor.

In Column 3, Line 40, delete "$\delta_{PUSCH}$" and insert -- $\delta_{PUCCH}$ --, therefor.

In Column 3, Line 43, delete "$\delta_{PUSCH}$" and insert -- $\delta_{PUCCH}$ --, therefor.

In Column 4, Line 7, delete "LTE" and insert -- LTE. --, therefor.

In Column 5, Lines 15-16,
delete "$P_{PUSCH,c}^{k}=\min\{P_{CMAX,x}^{k}-P_{PUCCH}^{k,PUCCH}, P_{0,PUSCH}^{k}+\alpha_k PL_c^k+10\log_{10}M_k+\nabla_{MCS}^k+f(i)_k\}$,"
and insert -- $P_{PUSCH,c}^{k}=\min\{P_{CMAX,c}^{k}-P_{PUCCH}^{k\_PUCCH},P_{0,PUSCH}^{k}+\alpha_k PL_c^k+10\log_{10}M_k+\nabla_{MCS}^k+f(i)_k\}$, --,
therefor.

In Column 5, Line 37, delete "M-0," and insert -- M=0, --, therefor.

In Column 5, Lines 45-47, delete
"$P_{PUSCH,c}(i,j,q,l)=\min\{P_{CMAX,c}(i)-P_{PUCCH}^{kPUCCH}(i),P_{0,PUSCH}(j)+\alpha_c(j)PL_c(q)+10\log_{10}M_{PUSCH,c}(i)+\nabla_{TF,c}(i)+fc(i,l)\}$" and insert -- $P_{PUSCH,c}(i,j,q,l)=\min\{P_{CMAX,c}(i)-P_{PUCCH}^{kPUCCH}(i),P_{0,PUSCH}(j)+\alpha_c(j)PL_c(q)+10\log_{10}M_{PUSCH,c}(i)+\nabla_{TF,c}(i)+fc(i,l)\}$ --, therefor.

In Column 5, Lines 63-64, delete "$P_{PUSCH,c}(i,j,q,l)=\min\{P_{CMAX,c}(i)-P_{PUCCH}^{kPUCCH}(i),P_{PUSCH,c}^{unlim}(i,j,q,l)\}$"
and insert -- $P_{PUSCH,c}(i,j,q,l)=\min\{P_{CMAX,c}(i)-P_{PUCCH}^{kPUCCH}(i),P_{PUSCH,c}^{unlim}(i,j,q,l)\}$. --, therefor.

In Column 12, Line 45, delete "(e.g . . . 1)." and insert -- (e.g., 1). --, therefor.

In Column 15, Line 46, delete "units" and insert -- units. --, therefor.

In Column 16, Line 59, delete "circuitry 190" and insert -- circuitry 192 --, therefor.

In Column 17, Line 67, delete "(VOIP)" and insert -- (VoIP) --, therefor.

In Column 18, Line 2, delete "cameras," and insert -- camera, --, therefor.

In Column 18, Line 7, delete "(CPE)." and insert -- (CPE), --, therefor.

In Column 18, Line 8, delete "etc. . . . A" and insert -- etc. A --, therefor.

In Column 18, Line 25, delete "etc.)" and insert -- etc.), --, therefor.

In Column 18, Line 61, delete "circuitry 114" and insert -- circuitry 112 --, therefor.

In Column 20, Line 22, delete "Rcad" and insert -- Read --, therefor.

In Column 21, Line 65, delete "(e.g., 1)" and insert -- (e.g., l) --, therefor.

In Column 22, Line 24, delete "(e.g., 1" and insert -- (e.g., l --, therefor.

In Column 22, Line 28, delete "(e.g., 1)" and insert -- (e.g., l) --, therefor.

In Column 22, Line 28, delete "consided" and insert -- considered --, therefor.

In Column 22, Line 31, delete "consided" and insert -- considered --, therefor.

In Column 23, Line 13, delete "positive." and insert -- positive, --, therefor.

In Column 23, Line 38, delete "(e.g., f1_c( ) and f2_c( )." and insert -- (e.g., f1_c( ) and f2_c( )). --, therefor.

In Column 23, Line 53, delete "entirety." and insert -- entirety). --, therefor.

In Column 24, Line 2, delete "$P_{PUSCH,c}^{unlim}(i, j, q, l) > ^{PCMAX,c}(i),$" and insert -- $P_{PUSCH,c}^{unlim}(i, j, q, l) > P_{CMAX,c}(i)$, --, therefor.

In Column 24, Line 16, delete "power_max limited" and insert -- power_max_limited --, therefor.

In Column 24, Line 19, delete "power_max limited" and insert -- power_min_limited --, therefor.

In Column 24, Line 53, delete "index I" and insert -- index l --, therefor.

In Column 24, Line 54, delete "index 1" and insert -- index l --, therefor.

In Column 25, Line 4, delete "step 110" and insert -- step 210 --, therefor.

In Column 25, Line 30, delete "(e.g., 1)" and insert -- (e.g., l) --, therefor.

In Column 26, Line 16, delete "(i.e., 1=2)," and insert -- (i.e., l=2), --, therefor.

In Column 26, Line 17, delete "1-2" and insert -- l=2 --, therefor.

In Column 26, Line 33, delete "(j,q,l)-(1,2,1) uses 1=1." and insert -- (j,q,l)=(1,2,1) uses l=1. --, therefor.

In Column 26, Line 34, delete "1=1." and insert -- l=1. --, therefor.

In Column 26, Line 37, delete "1=1." and insert -- l=1. --, therefor.

In Column 26, Line 39, delete "1=l₀" and insert -- l=l₀ --, therefor.

In Column 26, Line 40, delete "$S_{l_0}=\{(j,q,l):l=l_0\},$" and insert -- $S_{l_0}=\{(j,q,l):l=l_0\},$ --, therefor.

In Column 26, Line 50, delete "power_max_limited(l₀)" and insert -- power_min_limited(l₀) --, therefor.

In Column 27, Line 1, delete "1=1" and insert -- l=1 --, therefor.

In Column 27, Line 2, delete "1=1" and insert -- l=1 --, therefor.

In Column 27, Line 3, delete "1=2" and insert -- l=2 --, therefor.

In Column 27, Line 12, delete "otherwise" and insert -- otherwise. --, therefor.

In Column 27, Line 27, delete "receives 1" and insert -- receives l --, therefor.

In Column 27, Line 28, delete "I may" and insert -- l may --, therefor.

In Column 27, Line 30, delete "(e.g . . ." and insert -- (e.g., --, therefor.

In Column 27, Line 31, delete "1 may" and insert -- l may --, therefor.

In Column 27, Line 32, delete "1 may" and insert -- l may --, therefor.

In Column 27, Line 35, delete "power_max_lim(1)." and insert -- power_max_lim(l). --, therefor.

In Column 27, Line 37, delete "power_max_lim(1)," and insert -- power_max_lim(l), --, therefor.

In Column 27, Line 44, delete "of 8" and insert -- of δ --, therefor.

CERTIFICATE OF CORRECTION (continued)
U.S. Pat. No. 12,156,139 B2

In Column 27, Line 46, delete "of 8" and insert -- of $\delta$ --, therefor.

In Column 27, Line 49, delete "of 8." and insert -- of $\delta$. --, therefor.

In Column 27, Line 50, delete "8 is" and insert -- $\delta$ is --, therefor.

In Column 27, Line 50, delete "negativc), then method 300 procceds" and insert -- negative), then method 300 proceeds --, therefor.

In Column 27, Line 57, delete "for some" and insert -- for all --, therefor.

In Column 27, Line 58, delete "otherwise" and insert -- otherwise. --, therefor.

In Column 27, Line 62, delete "for some" and insert -- for all --, therefor.

In Column 28, Line 12, delete "procceds" and insert -- proceeds --, therefor.

In Column 28, Line 39, delete "p$_{PUSCH,c}$$^{unlim}$" and insert -- P$_{PUSCH,c}$$^{unlim}$ --, therefor.

In Column 28, Lines 41-43,
delete "P$_{PUSCH,c}$$^{unlim}$(i,j,q,l)=P$_{0,PUSCH}$(j)+α$_c$(j)PL$_c$(q)+10 log$_{10}$M$_{PUSCH,c}$(i)+∇$_{TF,c}$(i)+fc(i,l),–P$_{PUCCH}$$^{kPUCCH}$(i)" and insert
-- P$_{PUSCH,c}$$^{unlim}$(i,j,q,l)=P$_{0,PUSCH}$(j)+α$_c$(j)PL$_c$(q)+10log$_{10}$M$_{PUSCH,c}$(i)+∇$_{TF,c}$(i)+fc(i,l),–P$_{PUCCH}$$^{kPUCCH}$(i) --, therefor.

In Column 28, Lines 46-47,
delete "P$_{PUSCH,c}$$^{unlim}$(i,j,q,l)=P$_{0,PUSCH}$(j)+αc(j)PL$_c$(q)+fc(i,l)–P$_{PUCCH}$$^{kPUCCH}$(i)" and insert
-- P$_{PUSCH,c}$$^{unlim}$(i,j,q,l)=P$_{0,PUSCH}$(j)+α$_c$(j)PL$_c$(q)+fc(i,l)–P$_{PUCCH}$$^{kPUCCH}$(i) --, therefor.

In Column 28, Line 52, delete "related" and insert -- are related --, therefor.

In Column 28, Line 59, delete "fc(i,1)" and insert -- fc(i,l) --, therefor.

In Column 28, Line 62, delete "loos" and insert -- loops --, therefor.

In Column 28, Line 65, delete "is defined" and insert -- where P$_{SRS,c}$$^{unlim}$(i,j,q,l) is defined --, therefor.

In Column 29, Lines 5-15, delete

" $$\text{power\_max\_limited\_PUSCH}(l_0) = \begin{cases} true \text{ if } P^{unlim}_{PUSCH,c}(i,j,q,l) > P_{CMAX,c}(i) \text{ for all } (j,q,l) \in S^{PUSCH}_{l_0} \text{ and} \\ false \text{ otherwise.} \end{cases}$$

$$\text{power\_min\_limited\_SRS}(l_0) = \begin{cases} true \text{ if } P^{unlim}_{PUSCH,c}(i,j,q,l) > P_{CMAX,c}(i) \text{ for all } (j,q,l) \in S^{SRS}_{l_0} \text{ and} \\ false \text{ otherwise.} \end{cases}$$ "

and insert where $$power\_max\_limited\_PUSCH(l_0) = \begin{cases} true \text{ if } P_{PUSCH,c}^{unlim}(i,j,q,l) > P_{CMAX,c}(i) \text{ for all } (j,q,l) \in S_{l_0}^{PUSCH} \text{ and} \\ false \text{ otherwise.} \end{cases}$$

$$power\_max\_limited\_SRS(l_0) = \begin{cases} true \text{ if } P_{SRS,c}^{unlim}(i,j,q,l) > P_{CMAX,c}(i) \text{ for all } (j,q,l) \in S_{l_0}^{SRS} \text{ and} \\ false \text{ otherwise.} \end{cases}$$

--, therefor.

In Column 29, Line 25, delete "RAN1 #90bis" and insert -- RAN1#90bis --, therefor.

In Column 29, Lines 30-31, delete "RAN1 #90bis" and insert -- RAN1#90bis --, therefor.

In Column 29, Line 42, delete "fc(i,1)" and insert -- fc(i,l) --, therefor.

In Column 29, Line 44, delete "fc(i,1)" and insert -- fc(i,l) --, therefor.

In Column 29, Line 48, delete "fc(i,1)" and insert -- fc(i,l) --, therefor.

In Column 30, Line 25, delete "cell $_c$for" and insert -- cell c for --, therefor.

In Column 30, Line 29, delete "alpha-sets <2;" and insert the same at Line 28, after "num-p0-", as a continuation sub-point.

In Column 30, Line 32, delete "<2;" and insert the same at Line 31, after "p0-alpha-sets".

In Column 30, Lines 33-34, delete "j∈(2, . . . , J–1}=S," and insert -- j∈{2, . . . , J–1}=$S_J$, --, therefor.

In Column 30, Line 34, delete "Applicable" and insert -- applicable --, therefor.

In Column 30, Line 35, delete "j∈s," and insert -- j∈$S_J$, --, therefor.

In Column 30, Line 36, delete "cell $_c$" and insert -- cell c --, therefor.

In Column 30, Line 38, delete "cell $_c$" and insert -- cell c --, therefor.

In Column 30, Line 50, delete "fc(i,1)" and insert -- fc(i,l) --, therefor.

In Column 30, Line 62, delete "reset" and insert -- reset of --, therefor.

In Column 31, Line 30, delete "index/by" and insert -- index l by --, therefor.

In Column 31, Line 33, delete "{j',k', l'}" and insert -- {j',k',l'} --, therefor.

In Column 31, Line 53, delete "current" and insert -- currently --, therefor.

In Column 31, Line 62, delete "fc(i,1)" and insert -- fc(i,l) --, therefor.

In Column 31, Line 65, delete "fc(i,1)." and insert -- fc(i,l). --, therefor.

In Column 32, Line 4, delete "(f_c(i,1)), 1=1,2," and insert -- (f_c(i,l)), l=1,2, --, therefor.

In Column 32, Line 4, delete "in present" and insert -- present --, therefor.

In Column 32, Line 10, delete "f(i,1)" and insert -- f(i,l) --, therefor.

In Column 32, Line 17, delete "(f_c(i,1)), 1=1,2," and insert -- (f_c(i,l)), l=1,2, --, therefor.

In Column 32, Line 45, delete "3rd" and insert -- 3$^{rd}$ --, therefor.

In Column 32, Line 48, delete "interchangeable." and insert -- interchangeably. --, therefor.

In Column 35, Line 62, delete "690. Memory 690" and insert -- 690-1. Memory 690-1 --, therefor.

In Column 36, Line 41, delete "arc" and insert -- are --, therefor.

In Column 38, Line 54, delete "programmable" and insert -- or more programmable --, therefor.

In Column 38, Line 55, delete "field or more" and insert -- field --, therefor.

In Column 38, Line 56, delete "thesc" and insert -- these --, therefor.

In Column 42, Line 14, delete "(e.g., 1)" and insert -- (e.g., l) --, therefor.

In Column 43, Line 31, delete "according" and insert -- according to --, therefor.

In Column 44, Line 7, delete "(e.g., 1)" and insert -- (e.g., l) --, therefor.

In Column 44, Line 41, delete "1) indicating" and insert -- l) indicating --, therefor.

In Column 47, Line 25, delete "index (1)" and insert -- index (l) --, therefor.

In Column 47, Line 42, delete "index (1)." and insert -- index (l). --, therefor.

In Column 47, Line 49, delete "index (1)" and insert -- index (l) --, therefor.

In Column 47, Line 54, delete "index (1)" and insert -- index (l) --, therefor.

In Column 48, Line 62, delete "compriscs" and insert -- comprises --, therefor.

In Column 48, Line 62, delete "nodc" and insert -- node --, therefor.

In Column 50, Line 13, delete "of ay" and insert -- of any --, therefor.

In Column 50, Line 38, delete "nodc." and insert -- node. --, therefor.

In Column 51, Line 42, delete "according" and insert -- according to --, therefor.

In Column 52, Line 10, delete "Carrier Component" and insert -- Component Carrier --, therefor.

In Column 52, Line 12, delete "Multiplexing" and insert -- Multiple --, therefor.

In Column 52, Line 14, delete "Identifier" and insert -- Identity --, therefor.

In Column 52, Line 20, delete "information" and insert -- Indicator --, therefor.

In Column 52, Line 38, delete "E-SMLC evolved Serving Mobile Location Center".

In Column 53, Line 12, delete "Profile" and insert -- Power --, therefor.

In Column 53, Line 14, delete "Packet Gateway" and insert -- Packet Data Network Gateway --, therefor.

In Column 53, Line 17, delete "Precoder" and insert -- Precoding --, therefor.

In Column 53, Line 27, delete "Management" and insert -- Monitoring --, therefor.

In Column 53, Line 33, delete "Rcccived" and insert -- Received --, therefor.

In Column 53, Line 48, delete "Self Optimized" and insert -- Self-Organizing --, therefor.

In Column 53, Line 61, delete "Telecommunication" and insert -- Telecommunications --, therefor.

In Column 53, Line 66, delete "Wide" and insert -- Wideband --, therefor.

In Column 53, Line 67, delete "Wide" and insert -- Wireless --, therefor.

In the Claims

In Column 54, Line 9, in Claim 1, delete "loops is" and insert -- loops are --, therefor.

CERTIFICATE OF CORRECTION (continued)
U.S. Pat. No. 12,156,139 B2

In Column 54, Line 34, in Claim 2, delete "loops is" and insert -- loops are --, therefor.

In Column 55, Line 2, in Claim 6, delete "obtain a" and insert -- receive a --, therefor.

In Column 55, Line 23, in Claim 9, delete "obtain a" and insert -- receive a --, therefor.